(12) United States Patent
Sharma et al.

(10) Patent No.: US 11,151,583 B2
(45) Date of Patent: Oct. 19, 2021

(54) SHOE AUTHENTICATION DEVICE AND AUTHENTICATION PROCESS

(71) Applicant: Entrupy Inc., New York, NY (US)

(72) Inventors: Ashlesh Sharma, Redmond, WA (US); Ryan Keavney, New York, NY (US); Drew Barclay, New York, NY (US); Karl Friesen, New York, NY (US); Dharini Raghavan, Jersey City, NJ (US); Vishal Kanchan, New York, NY (US); Leah Grossart, Brooklyn, NY (US); Tiago Carvalho, Campinas (BR)

(73) Assignee: Entrupy Inc., New York, NY (US)

( * ) Notice: Subject to any disclaimer, the term of this patent is extended or adjusted under 35 U.S.C. 154(b) by 0 days.

(21) Appl. No.: 17/075,644

(22) Filed: Oct. 20, 2020

(65) Prior Publication Data

US 2021/0117984 A1  Apr. 22, 2021

Related U.S. Application Data

(60) Provisional application No. 62/924,145, filed on Oct. 21, 2019.

(51) Int. Cl.
*G01N 21/63* (2006.01)
*G06Q 30/00* (2012.01)
(Continued)

(52) U.S. Cl.
CPC ... *G06Q 30/0185* (2013.01); *G06K 19/06009* (2013.01); *G06T 7/001* (2013.01); *G06T 2207/30124* (2013.01)

(58) Field of Classification Search
CPC ............... G06T 1/0028; G06T 1/0071; G06T 2201/0083; G06T 1/0042; G06T 2201/0063; G06T 2201/0201; G06T 2201/0051; G06T 1/0021; G07D 7/1205; G07D 7/004; G07D 7/205; G07D 7/12; G07D 7/20; G07D 7/003; G07D 7/206; G07D 7/0034; G07D 7/0047; G07D 7/16; G07D 7/162; G07D 7/2033; G07D 7/2075; G07D 7/2083; G06K 9/00577; G06K 2009/0059; G06K 9/46; G06K 7/10;

(Continued)

(56) References Cited

U.S. PATENT DOCUMENTS

2013/0088555 A1*  4/2013  Hanina ............... G06K 7/10722
                                                        347/107
2013/0120976 A1*  5/2013  Marston ............... B65D 51/248
                                                        362/155

(Continued)

OTHER PUBLICATIONS

International Search Report in PCT Application No. PCT/US20/56539, dated Mar. 2, 2021.

*Primary Examiner* — Quan M Hua
(74) *Attorney, Agent, or Firm* — Cognition IP, P.C.; Edward Steakley

(57) ABSTRACT

A method and system may be used to determine whether a suspect item is counterfeit. In the method and system, images may be analyzed in order to identify regions of interest of the item. The method and system may compare characteristics of different regions of interests against threshold characteristics derived from an item model. A determination that the suspect item is counterfeit is based on a result of the comparison.

18 Claims, 26 Drawing Sheets

(51) Int. Cl.
*G06K 19/06* (2006.01)
*G06T 7/00* (2017.01)

(58) Field of Classification Search
CPC .... G06K 9/00442; G06K 7/14; G06K 7/1413; G06K 7/1417; G06K 7/1434; G06K 9/2018; G06K 9/522; G06K 9/62; G06K 9/6215; G06K 9/6218; G06K 19/086; G06K 9/00127; G06K 9/00288; G06K 9/00456; G06K 9/00463; G06K 9/00483; G06K 9/0053; G06K 9/0057; G06K 9/183; G06K 9/42; G06K 9/6201
See application file for complete search history.

(56) References Cited

U.S. PATENT DOCUMENTS

| | | |
|---|---|---|
| 2014/0279613 A1 | 9/2014 | Lee et al. |
| 2015/0117701 A1* | 4/2015 | Ross ................. G06K 9/00744 382/100 |
| 2015/0224738 A1* | 8/2015 | Gallagher ........... B29C 65/5042 442/1 |
| 2017/0032285 A1* | 2/2017 | Sharma ................ G06N 3/0454 |

* cited by examiner

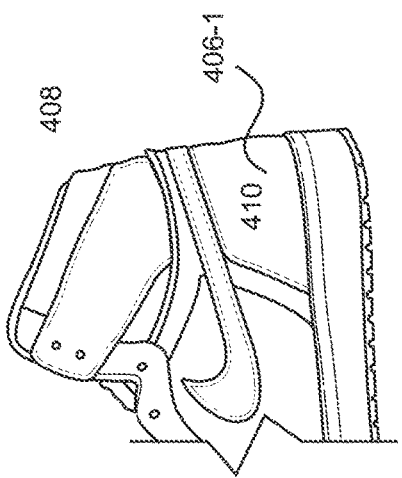
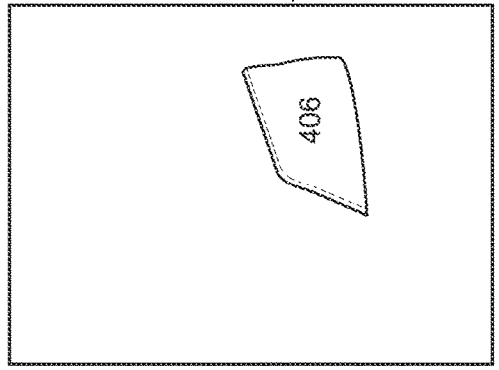
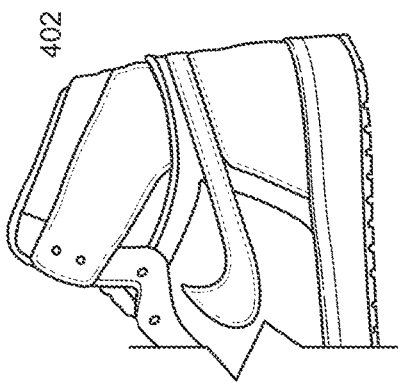
FIG. 4A
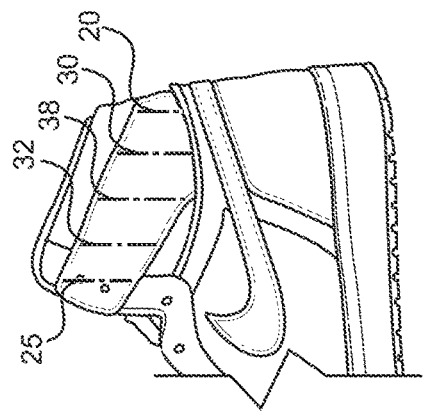
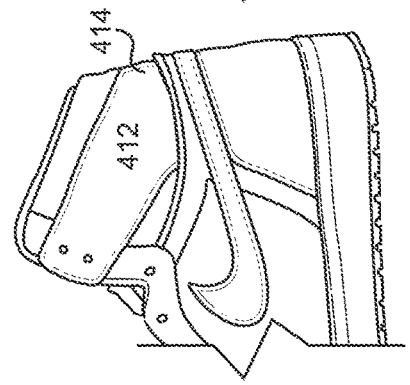
FIG. 4B

| | AUTHENTIC_8GWQDG4.camera.left | AUTHENTIC_8VKH8C2.camera.left | AUTHENTIC_9DMCD4H.camera.left | AUTHENTIC_9Q2YRGD.camera.left | AUTHENTIC_BG66732.camera.left | AUTHENTIC_H3YX7HJ.camera.left | AUTHENTIC_Q3W9R6B.camera.left | AUTHENTIC_T96J8YG.camera.left | AUTHENTIC_VBY282C.camera.left | FAKE_VHTGKHD3.camera.left | FAKE_VKTG623.camera.left |
|---|---|---|---|---|---|---|---|---|---|---|---|
| AUTHENTIC_8GWQDG4.camera.left | 0 | 0 | 0.86 | 0 | 0 | 0.91 | 0 | 0 | 0 | 0 | 0 |
| AUTHENTIC_8GVKH8C2.camera.left | 0 | 0 | 0 | 0 | 1.82 | 0 | 1.82 | 0 | 0 | 0 | 0 |
| AUTHENTIC_9DMCD4H.camera.left | 0.86 | 0 | 0 | 0 | 0 | 1.2 | 0 | 0 | 0 | 0 | 0 |
| AUTHENTIC_9Q2Y3GD.camera.left | 0 | 0.65 | 0 | 0 | 0 | 0 | 0.54 | 0 | 0 | 0 | 0 |
| AUTHENTIC_BG66732.camera.left | 0 | 0.45 | 0 | 0 | 0 | 0 | 0.47 | 0 | 0 | 0 | 0 |
| AUTHENTIC_H3YX7H.camera.left | 0.91 | 0 | 0 | 0 | 0 | 0 | 0 | 0 | 0.88 | 0 | 0 |
| AUTHENTIC_Q3W9R6B.camera.left | 0 | 0.28 | 0 | 0 | 0.47 | 0 | 0 | 0 | 0 | 0 | 0 |
| AUTHENTIC_T96J8YG.camera.left | 0 | 0 | 0 | 0 | 0 | 0.54 | 0 | 0 | 0.5 | 0 | 0 |
| AUTHENTIC_VBY282C.camera.left | 0 | 0.88 | 0 | 0 | 0 | 0 | 0 | 0.5 | 0 | 0 | 0 |
| FAKE_HTGKHD3.camera.left | 0 | 0 | 0 | 0 | 0 | 1.8 | 0 | 0 | 0 | 0 | 0.63 |
| FAKE_VKTG623.camera.left | 0 | 0 | 0 | 0 | 0 | 1.8 | 0 | 0 | 0 | 6.3 | 0 |

FIG. 21

SHOE AUTHENTICATION DEVICE AND AUTHENTICATION PROCESS

CROSS-REFERENCE TO RELATED APPLICATIONS

This application claims the benefit of U.S. Provisional Application No. 62/924,145, filed Oct. 21, 2019, which is hereby incorporated by reference in its entirety.

BACKGROUND

Various industries have experienced an increase in popularity due to a proliferation of brands and products that have increased in value in the resale world. The limited release of some types of specialized models of items has made those limited release items some of the most coveted in the market. Due to the exclusivity of limited release items, counterfeit items have proliferated the marketplace. A hapless user who purchases a limited release item from one of many marketplaces or stores has no knowledge if the item that is purchased is authentic or not. While the marketplace ensures that the item is authentic, customers get duped a lot of times. At times, even the marketplace or store owners are unsure of the authenticity of some items. This leads to a lack of trust in the transaction and may eventually result in curbing the growth of various industries.

SUMMARY

Some of the disclosure herein relates to a method, computer-program product and a system for an authentication engine that determines the authenticity of a suspect item. An authentic item may be an item that was constructed, designed or supplied by an entity (such as a company or brand) that is an expected and trusted source of the item. A counterfeit item may be an item that was constructed, designed or supplied by an unauthorized entity that is unidentified or unknown to a purchaser of the item. A suspect item is an item which has yet to be identified as either an authentic item or a counterfeit item.

One embodiment relates to an authentication engine that identifies different regions of interest portrayed in one or more images of a suspect item. The different regions of interests are measured and the measurements are compared to threshold measurements (or threshold data) of an item model that corresponds to an authentic version of the suspect item. A determination of whether the suspect item is authentic or counterfeit is generated based on a result of the comparison.

One embodiment relates to an authentication engine directed to a machine learning, data-based system to determine whether a suspect item, such as a suspect athletic-fashion shoe ("sneaker"), is counterfeit. Various embodiments may include placing the suspect sneaker inside a lightbox that provides an imaging setup to capture consistent images of various portions and views of the suspect sneaker. The images may be captured at a specific resolution(s) to obtain information about regions of interest and the textures of materials (e.g. fabric, leather, suede, canvas) of the sneaker. The captured images may be uploaded to a server(s) or cloud computing environment for processing the images by the authentication engine to provide a notification of whether or not the suspect sneaker is authentic of fake counterfeit.

One embodiment relates to a client-server application framework of the authentication engine that manages multiple cameras in the lightbox and provides an end user with a single server device to manage operation of the authentication engine. One embodiment of the authentication engine may be based on a skip connection algorithm based convolutional-deconvolutional neural network to segment various regions of interest on the sneaker portrayed in one or more images. One embodiment relates machine learning implemented according to the extraction of measurements and textures of the sneaker regions of interest in order to classify them into authentic and counterfeit categories.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 4A is an exemplary diagram of one possible authentication engine phase in some embodiments.

FIG. 4B is an exemplary diagram of one possible authentication engine phase in some embodiments.

FIG. 21 is an exemplary diagram of one environment in which some embodiments may operate.

DETAILED DESCRIPTION

Figure 1A:
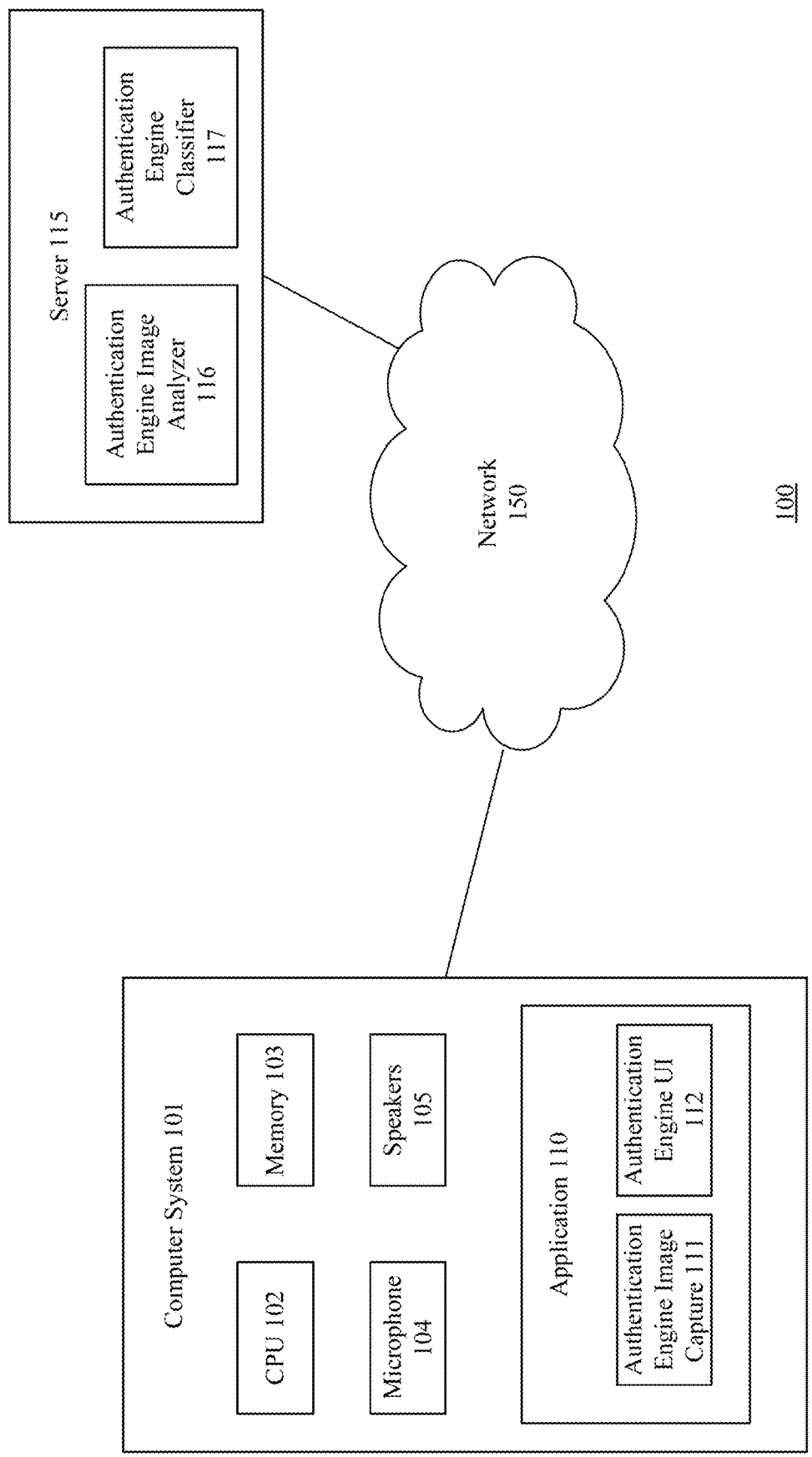
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

With respect to current conventional systems, manual authentication has been the primary mode of item authentication. For example, an expert in a certain style or brand of an item examines the item and provides their opinion on the authenticity of the item. If the item is authentic, A tag (i.e. barcode, RFID, removable sticker) is affixed to the item to indicates that the item has been authenticated. Another example of a conventional approach involves an end-user uploading images of the item to an online service. Upon receipt of the images, an expert associated with the online service may then review the images in order to verify the presence of certain characteristics of authenticity. The online service then sends the expert's determination back to the end-user.

In addition, various conventional online marketplaces may sell an item and verify the authenticity of the item once the end-user has completed a purchase transaction for the item. In response to the end-user's purchase transaction, the item may be shipped from the seller's location to a warehouse for the online marketplace. Once there, an employee of the online marketplace inspects the item to determine the authenticity of the item. If the employee determines the item is authentic, it is then shipped to the location of the end-user.

FIG. 1A is a diagram illustrating an exemplary environment 100 in which some embodiments may operate. Computer system 101 may be provided to perform aspects related to determining whether a suspect item is a counterfeit item. The computer system 101 may comprise, for example, a smartphone, smart device, smart watch, tablet, desktop computer, laptop computer, notebook, server, or any other processing system. In some embodiments, the computer system 101 is mobile so that it fits in a form factor that may be carried by a user. In other embodiments, the computer system 101 is stationary. The computer system 101 may include a CPU 102 and memory 103. The computer system 101 may include internal or external peripherals such as a microphone 104 and speakers 105. The computer system may also include authentication application 110, which may comprise an image capture system 111 and a user interface (UI) system 112.

The computer system 101 may be connected to a network 150. The network 150 may comprise, for example, a local network, intranet, wide-area network, internet, the Internet, wireless network, wired network, Wi-Fi, Bluetooth, a network of networks, or other networks. Network 150 may connect a number of computer systems to allow inter-device communications. Server 120 may be connected to computer system 101 over the network 150. The server 115 may comprise an image analyzer 116 and classifier 117.

The environment 100 may be a cloud computing environment that includes remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 1B:
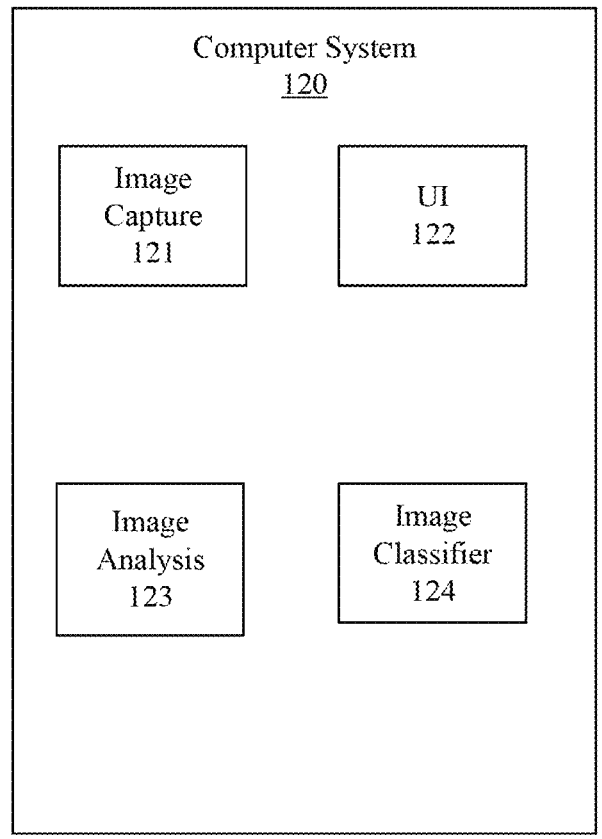
FIG. 1B is a diagram illustrating an exemplary computer system that may execute instructions to perform some of the methods herein.

FIG. 1B illustrates an exemplary computer system 120 with software modules that may execute some of the functionality described herein. An Image Capture module 121 may provide image capture functionality for capturing one or more images. The Image Capture module 121 may respond to user input requesting that one or more images of a suspect item be captured. The Image Capture Module 121 may initiate triggering of one or more image capture devices to obtain imagery of a suspect item, for example a shoe. The Image Capture Module 121 may be configured to obtain a required number of digital images or views of the suspect item.

Figure 3:
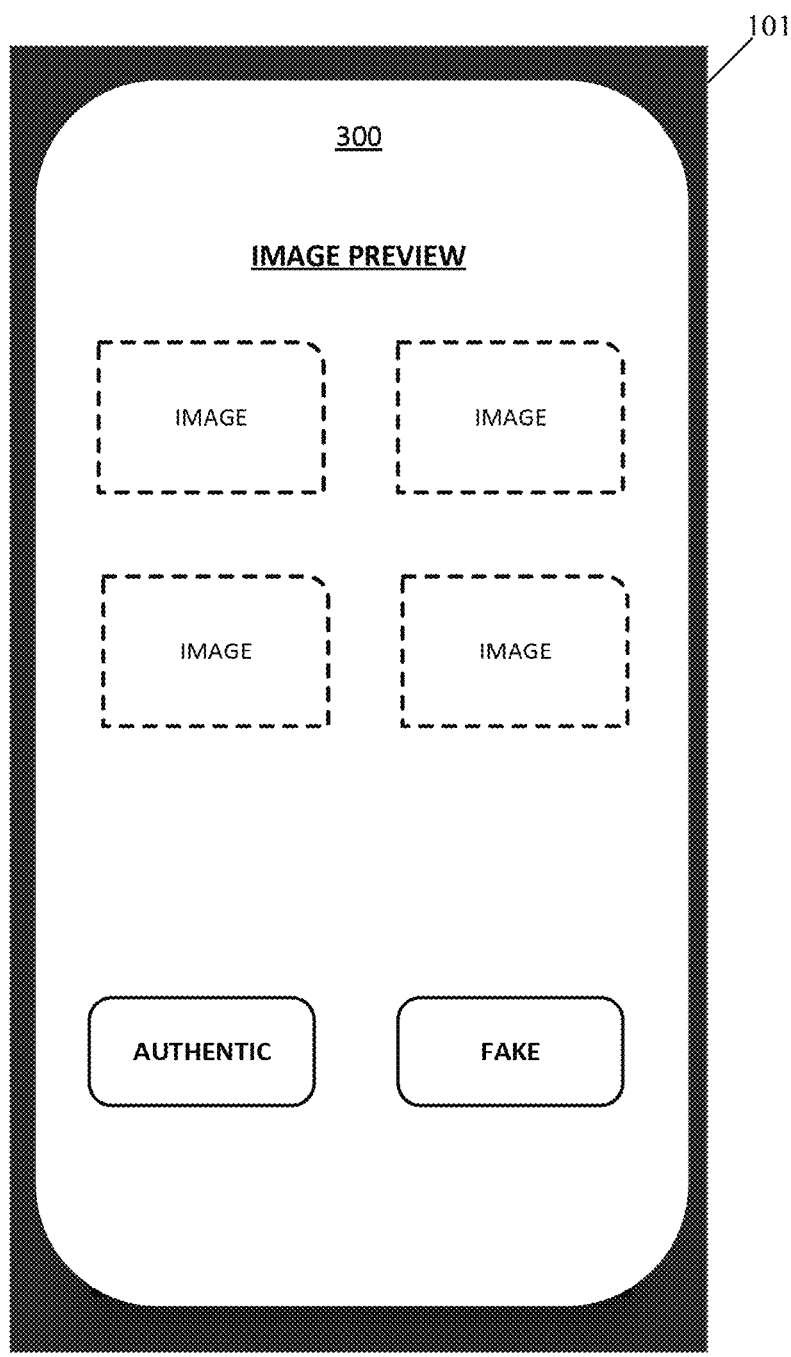
FIG. 3 illustrates an exemplary user interface that may be used in some embodiments.

A User Interface module 122 may perform functionality for rendering a user interface(s). The User Interface module 121 may include a user interface as illustrated in FIG. 3.

An Image Analysis module 123 may perform functionality for analyzing one or more images. The Image Analysis module 123 may analyze images as illustrated in FIGS. 2A-B, FIGS. 4A-4D and FIGS. 18-19 and 22.

An Image Classifier module 124 may perform functionality for classifying a suspect item as either an authentic item or a counterfeit item. The Image Classifier module 124 may classify a suspect item as illustrated in FIGS. 2A-B, FIGS. 4C-4E and FIGS. 20-21.

Figure 2A:
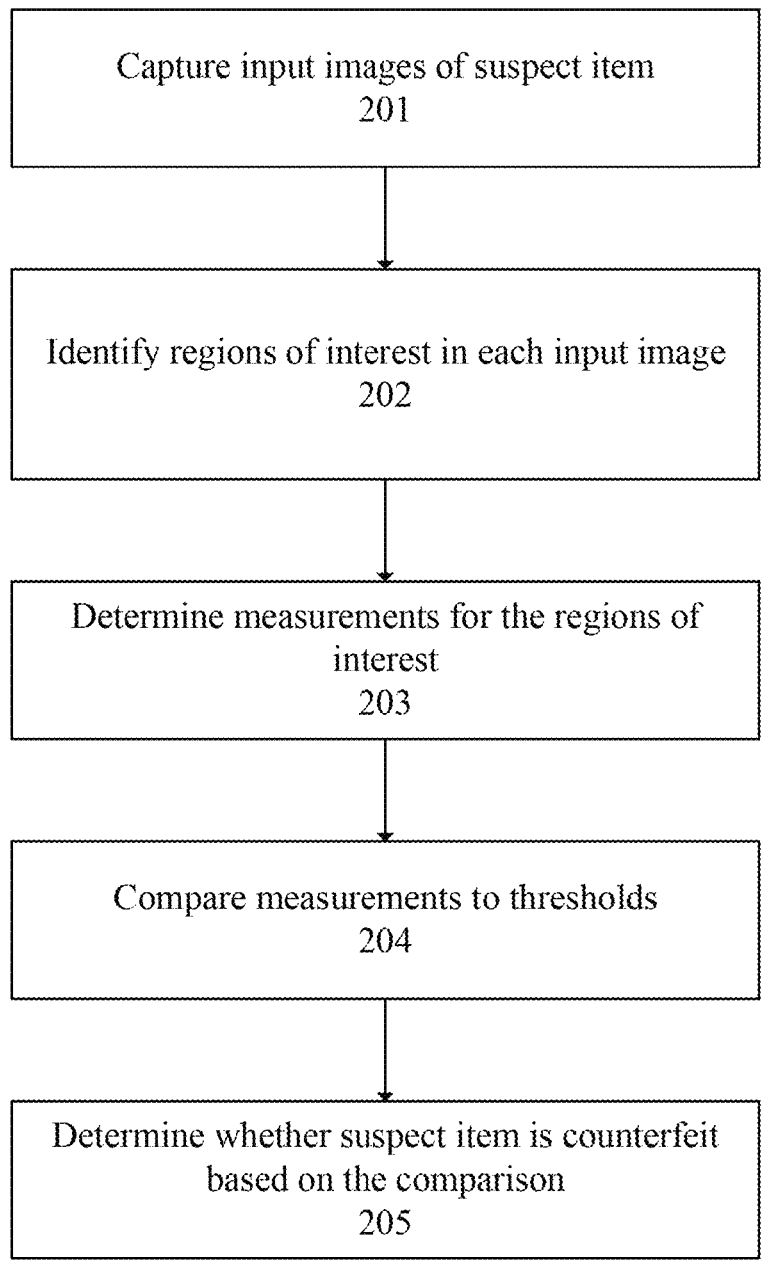
FIG. 2A is a flow chart illustrating an exemplary method that may be performed in some embodiments.

FIG. 2A is a flow chart illustrating one exemplary method 200 that may be performed consistent with an embodiment. The computer system performing the method may capture input images of a suspect item (Act 201). Multiple cameras in communication with the computer may capture multiple input images of a suspect item. Each input image portrays a different view of the suspect item or a different portion of the suspect item. In one embodiment, multiple images may not be required and a single image of a specified or user-selected portion of the suspect item may be captured.

The computer may identify regions of interest in each input image (Act 202). For example, the computer may analyze each input image to identify portions of the suspect item portrayed in the input image that are regions of interest. The computer may have an identification of an item model associated with the suspect item which provides access local data and/or remote data that guides the computer in locating various types of regions of interests of the suspect item. An input image of the suspect item may portray no regions of interests, a single region of interest or multiple regions of interest.

The computer may determine measurements for the regions of interest (Act 203). Once a region of interest has been extracted from an input image, the computer may determine one or more measurements with respect to the region of interest and corresponding image data of a portion of the suspect item that fills the region of interest. A region of interest may have one measurement or multiple measurements. A region of interest may have a boundary identified by the computer and the boundary may be transposed over the corresponding image data. The computer may take measurements relative to the boundary and the corresponding image data. The computer may combine measurements from multiple regions of interest.

The computer may compare the measurements to thresholds (Act 204). The computer may process and analyze the measurements for the regions of interest against threshold measurements and threshold data. The threshold measurements and data are representative of attributes and characteristic of an authentic instance of the item. Threshold measurements and data may be a valid range of measurement, coloration and texture that occurs within a specific region of interest. The threshold measurements and data may be specific to the suspect item's possible authentic type. There may be threshold measurements and data specific to a plurality of types of different items. The threshold measurements and data may be learned data based on training data and computational results of a machine learning supervised learning embodiment. In the machine learning embodiment, the threshold measurements and data may assist the computer to classify each region of interest.

The computer may determine whether suspect item is a counterfeit item based on the comparison (Act 205). The computer may determine a probability of the suspect item's authenticity based on how measurements for the regions of interest compare to the threshold measurements and data. The computer may determine a probability of the suspect item's authenticity based on how the threshold measurements and data result in a classification of the measurements for the regions of interest. A determination that the suspect item is counterfeit may be sent as a representative notification to a local computer or mobile device. A determination that the suspect item is authentic may also be sent as a representative notification to a local computer or mobile device.

Some of the steps of exemplary method 200 may be performed in different orders or in parallel. Also, the steps of exemplary method 200 may occur in two or more computers, for example if the method is performed in a networked environment some steps may be performed on different computers. Various steps may be optional.

Figure 2B:
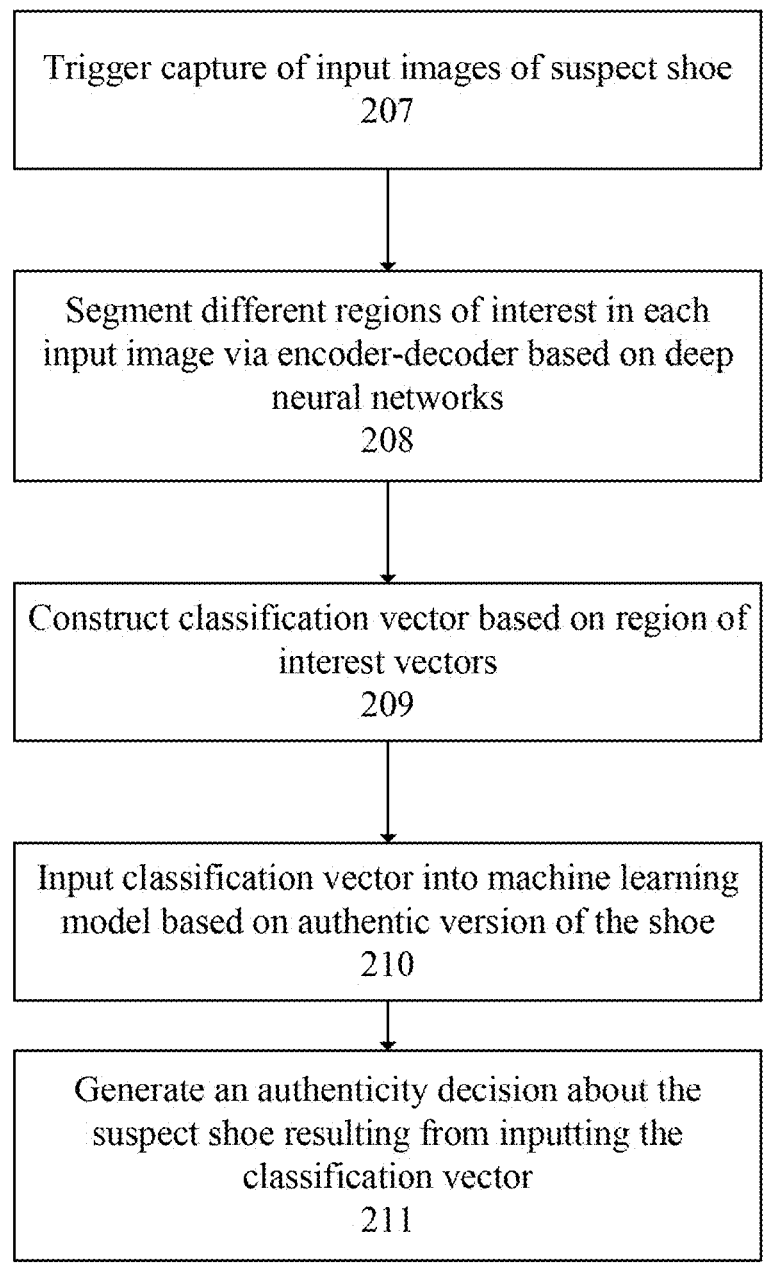
FIG. 2B is a flow chart illustrating an exemplary method that may be performed in some embodiments.

FIG. 2B is a flow chart illustrating one exemplary method 206 that may be performed consistent with an embodiment. The computer system performing the method may trigger the capture of input images of a suspect shoe (Act 207). A local computer or mobile device may trigger one or more remote cameras to capture images of the suspect shoe. The suspect shoe may be placed in an expected fixed position to be surrounded by multiple cameras in such a way that multiple input images are captured that portray different pre-selected portions or views of the suspect shoe. The local computer or mobile device may receive the input images and provide the input images in a display to the end-user for preview and acceptance. The local computer or mobile device may receive a selection from a user interface menu indicating the end-user would like to upload the input images to a remote server or to a cloud computing environment.

The collection of images and/or the authentication task may be assigned a unique identifier. The unique identifier for the authentication task further used by the system in storage, retrieval as to the captured imagery and/or the results of the authentication processing and decision.

The computer may segment different regions of interest in each input image (Act 208). For example, a remote server or to a cloud computing environment may receive the input images and perform segmentation of the input images in order to extract different regions of interest portrayed in the input images of the suspect show. In one embodiment, the segmentation may be performed according to a deep neural network architecture based on an encoder-decoder structure. The encoder may be composed by convolutional and pooling layers while the decoder applies deconvolutional and unpooling operations added by a signal(s) directly received from the encoder. Segmentation of the input images may result in image data from the different regions of interest (RoI) are extracted from the input images The computer may construct a classification vector based on vectors of the regions of interest. (Act 209). The computer may perform measurement operations relative to the extracted RoI image data and RoI boundaries. Values derived from the measurement operations may be used to construct RoI feature vectors where the values may correspond to a feature type having a pre-defined placement in an RoI feature vector. Multiple RoI feature vectors may be fused (or merged) together to create a classification vector.

The computer may input the classification vector into a machine learning model based on an authentic version of the shoe. (Act 210). A classifier based on the machine learning model that represents attributes that are expected to be present on an authentic version of the shoe may receive the classification vector to determine a likelihood that the suspect shoe is counterfeit. One or more RoI feature vectors may be treated as distinct classification vectors and be input into specific RoI classifiers as well. As a result of inputting the classification vector, the computer may generate an authenticity decision about the suspect shoe (Act 211).

The input images may be saved on a local computer or on a remote storage device. (A remote storage device includes a hard disk or other non-volatile memory of a remote server and other storage devices that may be connected to a remote server).

Some of the steps of exemplary method 206 may be performed in different orders or in parallel. Also, the steps of exemplary method 206 may occur in two or more computers, for example if the method is performed in a networked environment. As one possible example, step 207 may occur on a local computer or on a mobile device while steps 208, 209, 210 and 211 may occur on a remote computer. In such an example, the local computer or the mobile device may be providing an interface for triggering capture of the input images, previewing the input images and triggering the upload of the input images to a remote server. Various steps may be optional, such as receiving and display the authenticity decision at the local computer or the mobile device.

As shown in FIG. 3, an exemplary user interface 300 displayed on the computer system 101 may include an image preview section that displays one or more captured input images. The user interface 300 may also include icons that indicate whether a suspect item is authentic or fake. The interface 300 is exemplary and should not be viewed as limiting. The user interface 300 may receive a user input to trigger the image capture for one or more image capture device (e.g., a mobile device or digital camera). For example, the user interface 300 may present a capture button or other user affordance that would initiate the capture of the images from the image capture devices. The user interface 300 may also allow the user to select which captured images to analyze and which selected portions of images to analyze.

Figure 13:
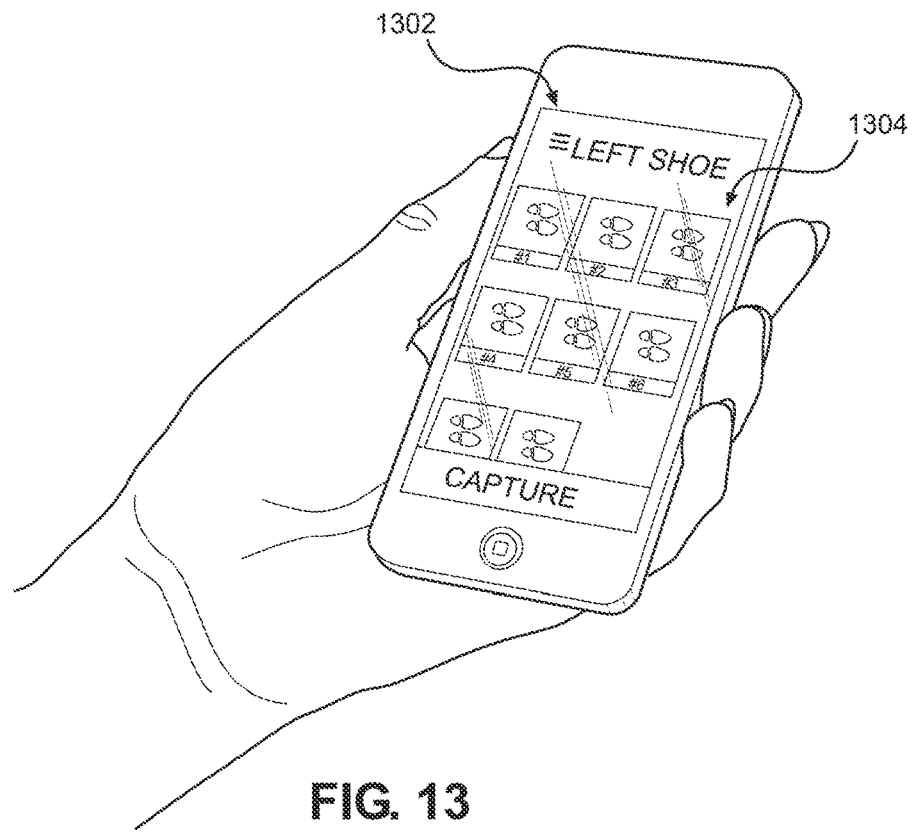
FIG. 13 is an exemplary diagram of one environment in which some embodiments may operate.
Figure 14:
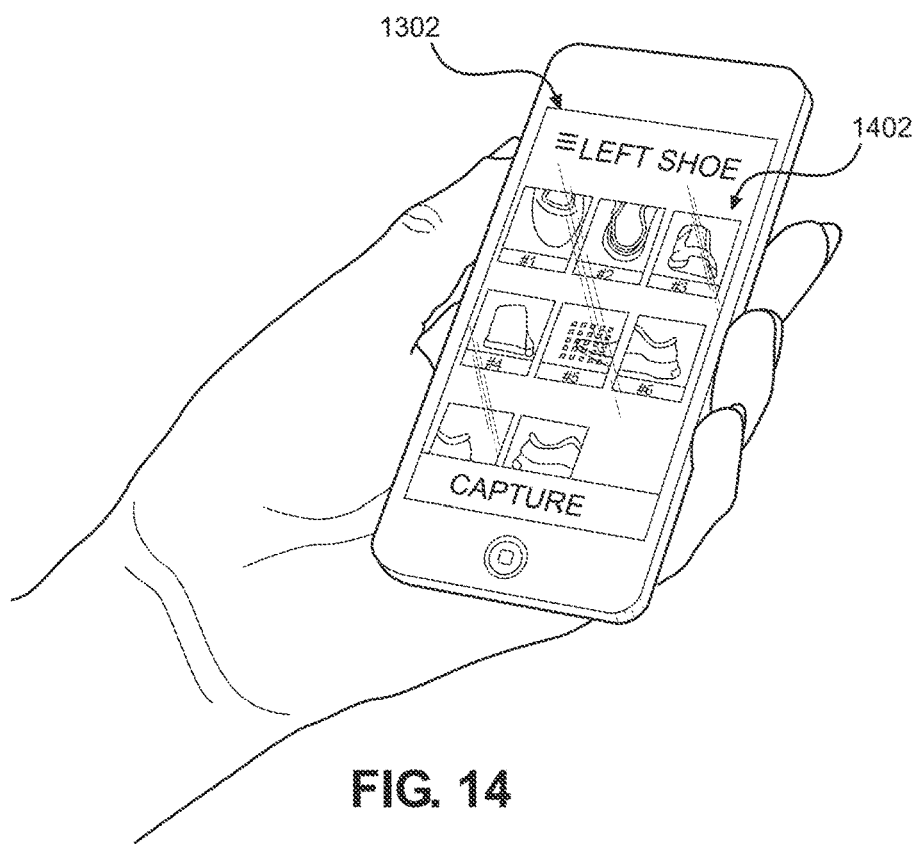
FIG. 14 is an exemplary diagram of one environment in which some embodiments may operate.
Figure 15:
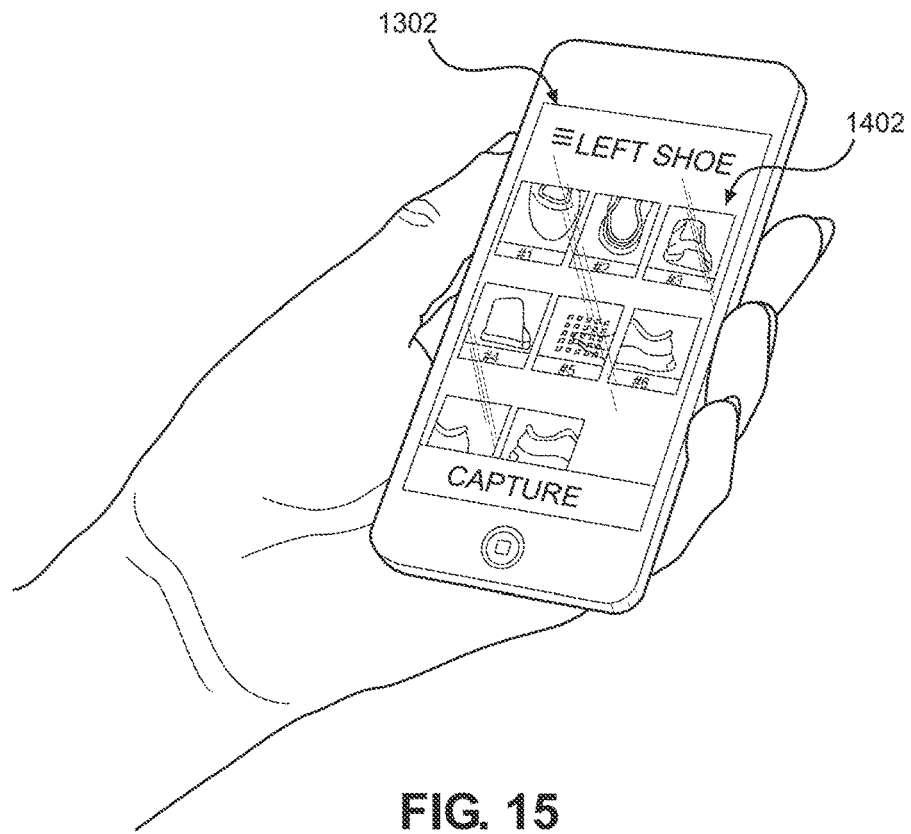
FIG. 15 is an exemplary diagram of one environment in which some embodiments may operate.

Also, as further illustrated as to FIGS. 13-15, the user interface may depict multiple bounding boxes where respective captured images may be depicted. Once an image is captured, a thumbnail image of the shoe is depicted in the bounding box. The user interface 300 may present a bounding box for an image to be obtained by the system for each of the image capture devices. The user interface may provide a graphical indication of the status and/or validity of the captured image. For example, the bounding box may include a status indicator identifying that the image was successfully captured. The status indicator may be a color (such as green to indicate capture successful, yellow to indicate capture in process, or red to indicate capture failed), or a graphical icon positioned on or adjacent to the respective bounding box. When a particular image is captured, the system may perform a quality check to determine whether the image is of sufficient quality to be further processed. For example, the system may evaluate image characteristics such as the luminosity, color, hue, tone, saturation, blur and/or brightness of the image and compare the image characteristics to a predetermined value to confirm that the image meets a sufficient or minimum threshold quality to be further processed by the system.

In one embodiment, the user interface may trigger the capture of digital imagery directly with the device presenting the user interface (e.g., a hand-held device or mobile device). For example, the device, via the user interface, may present a requested view of a suspect item to be taken (e.g., a front view, side views, back view, top view and/or bottom view of the suspect item). For example, the user interface may prompt the user to obtain an image for a front-view of the item. The user interface may engage the functionality of an on-board camera of the device to obtain the digital imagery of the item. The user interface may then instruct the user to obtain the other required views and obtain digital imagery for those views. The device or system may also perform a check to determine if the image is of a sufficient quality to be further processed (in a manner as discussed above). Moreover, the device or system may perform a check to determine if the view is likely the required view. For example, if the requested view is for the bottom of a shoe, then the device or system may process the image to confirm that the shoe is of the requested view type. This may be done by object recognition or using a machine learning network to that has been trained with different views of an item (e.g., the top, bottom, side, front, and or back of different types of shoes.). If the device or system determines that the image is not of a sufficient quality or that the image, or that the view is not of the correct view type, then the user interface may provide an indication to the user that a image for the particular view needs to be retaken. Once one or more images for the required views have been taken, then the system may process the one or more images, as described herein, to determine the authenticity of a suspect item.

Moreover, the system may be configured to select video frames from a video taken of a suspect item. For example, a video file may be obtain depicting various views of the item. The system then may receive the video file and process the video file to extract frames from the file that depict one or more views of the suspect item. The result of the processing of the video file are extracted images depicting different views the suspect item. As described above, a machine learning network may be used to receive frames from the video file and identify a likely view of the frame (such as a front view, side view, etc.). The system may select the best image frame to use for processing based on whether the image quality or characteristics of the image are sufficient to be further processed, as described herein, to determine the authenticity of the suspect item.

Authentic Engine functionality may be implemented in a variety of ways. As shown in FIG. 4A, given an input image 402, a result binary mask 406 is generated for a possible region of interest (RoI) 410 portrayed in the input image 402. An RoI boundary 406-1 is defined according to the binary mask and transposed over image data of the possible region of interest (RoI) 410.

For example, after the input image 402 passes through one more encoder layers, a feature map size may get reduced. A decoder is then needed to recover the feature map size for the segmentation image 408 by way of using up-convolution layers. The decoder may lose some of the higher-level features learned by the encoder. To account for the lost higher-level features, a skip connection-based convolutional-deconvolutional neural network ("skip-connect network") may be used to segment regions of interest in the input images. The skip-connect network of the encoder-decoder architecture skip connects which copy encoders signal directly into decoder layers to guarantee that all the important pieces of information can be preserved.

Figure 23:
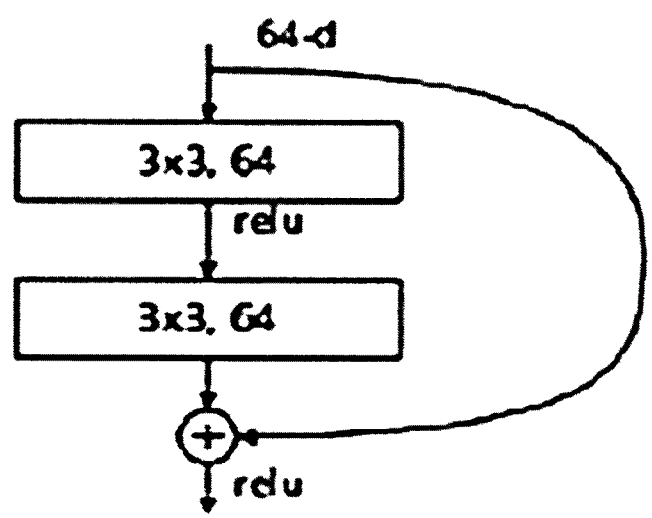
FIG. 23 is an exemplary diagram of one environment in which some embodiments may operate.

For the encoder-decoder, different convolutional neural network (CNN) architectures can be applied. A ResNet34 [2] architecture can be used herein, which includes 33 convolutional layers (where the top layers have been removed), with different kernel sizes (7×7 and 3×3) and numbers of filters (64, 128, 256, 512). Additionally, each residual block may be 2 layers deep and has a residual path for connecting a signal from block input to block output, as depicted in FIG. 23.

For the decoder, a ResNet 34 architecture may be implemented, keeping the same 33 layers and replacing convolutional layers by deconvolutional layers, pooling by unpooling and further adding skipping connections at the end of each bigger convolutional block As stated above, the output result is binary mask 406 that defines an RoI boundary 406-1 for the possible region of interest 410. The encoder-decoder may also use a ResNet architecture as well.

As shown in FIG. 4B, a region of interest 412 in image data of an ankle portion of the suspect shoe is identified with an RoI boundary 414 defined according to a corresponding binary mask. To calculate measurements for the ankle portion, a set $X=\{x_1, x_2, \ldots, x_n\}$ of points is selected along a horizontal extension of segmented mask for ankle as defined by the RoI boundary 414. For each point $x_i$, a distance in pixels may be measured between the lowest and the highest points inside the mask's RoI boundary 414. Such returned pixel distance measurements relative to the binary mask's RoI boundary 414 may be 25, 32, 38, 30 and 20.

Figure 4C:
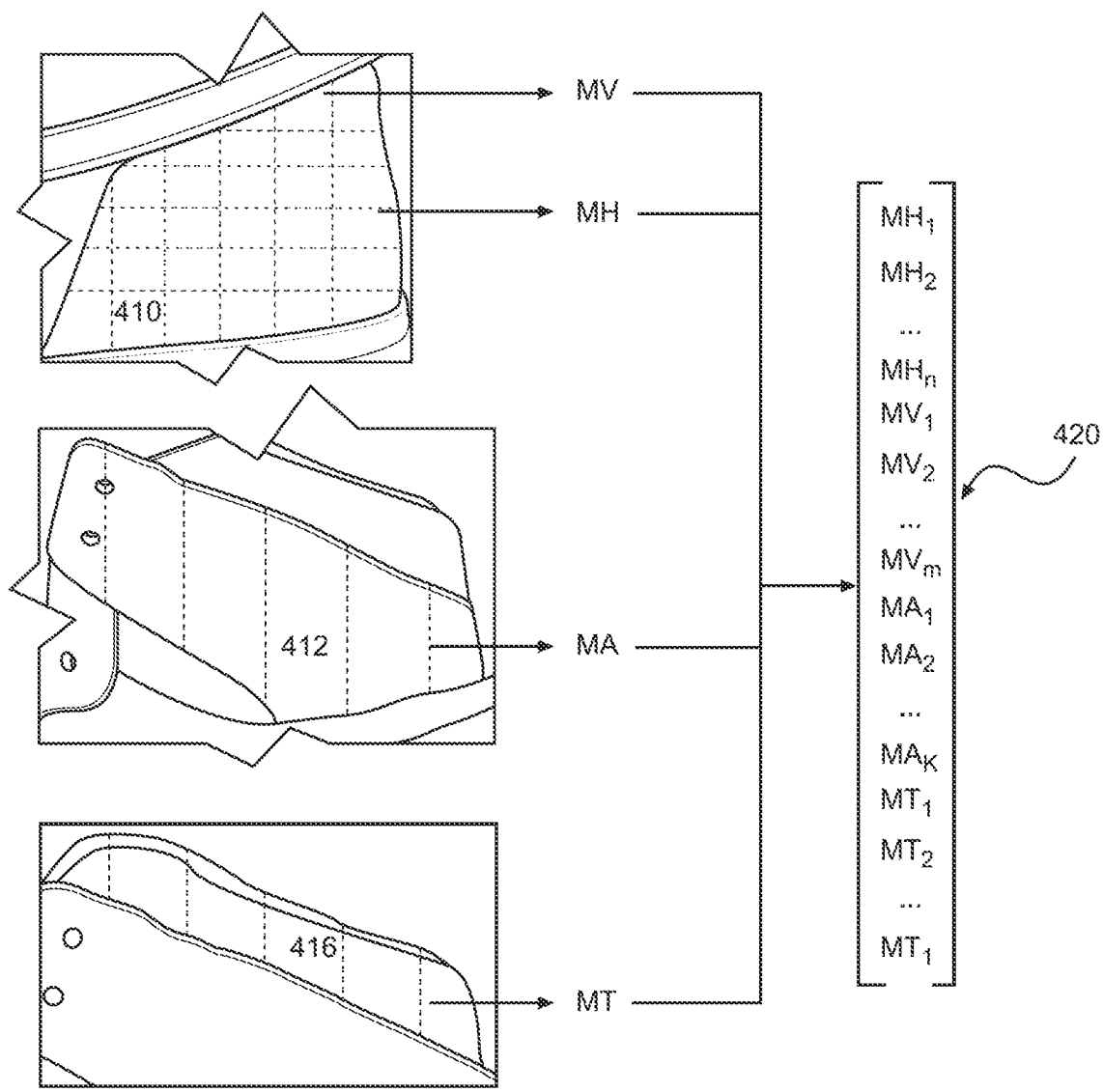
FIG. 4C is an exemplary diagram of one possible authentication engine phase in some embodiments.

As shown in FIG. 4C, measurements along a vertical extension "MV" and along a horizontal extension "MH" are calculated for a first possible region of interest 410 that has been demarcated according to a binary mask RoI boundary. Measurements "MA" for second possible region of interest 412 for an ankle portion of the shoe are also calculated along with measurements "MT" for a third possible region of interest 416 for a top portion of the suspect shoe that has also been demarcated by a binary mask RoI boundary. All the measurements are aggregated and combined to form a classification feature vector 420 where a value for each of the measurements of MV, MH, MA, MT corresponds to a placement of a feature type in the classification feature vector 420.

Figure 4D:
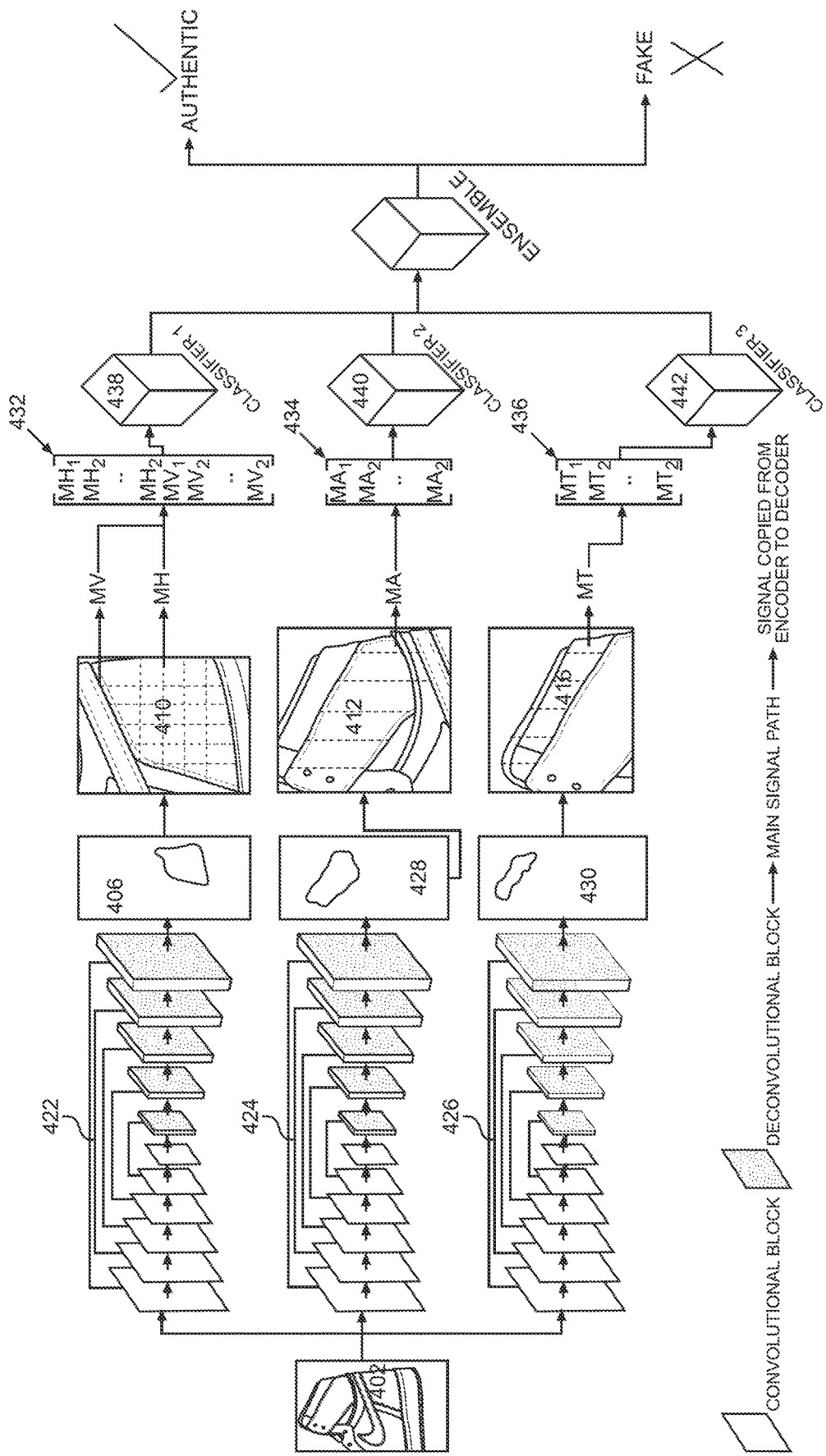
FIG. 4D is an exemplary diagram of one possible authentication engine phase in some embodiments.

As shown in FIG. 4D, an input image 402 of a suspect shoe passes through multiple convolutional-deconvolutional CNN layers 422, 424, 426 in order identify binary masks 406, 428, 430 for possible regions of interest 410, 412, 416 portrayed in the input image 402. Feature vectors 432, 434, 436 for the regions of interest 410, 412, 416 are constructed based on values of pixel distance measurements taken within the regions of interest 410, 412, 416. Each feature vector 432, 434, 435 is passed through a corresponding region of interest classifier 438, 440, 442, where the classifiers 438, 440, 442 are defined according to a machine learning supervised learning model that corresponds to features present on an authentic version of the suspect shoe. For example, a type of feature that indicates a likelihood of authenticity of a suspect show may be a learned range of a width of a seam stitched in a particular region of interest. The classifiers 438, 440, 442 determine a likelihood results of whether or not an input region of interest vector represents an portion of an authentic shoe. The likelihood results from the classifiers 433, 440, 442 are further used to make a final determination of whether the suspect shoe is authentic or counterfeit.

Figure 4E:
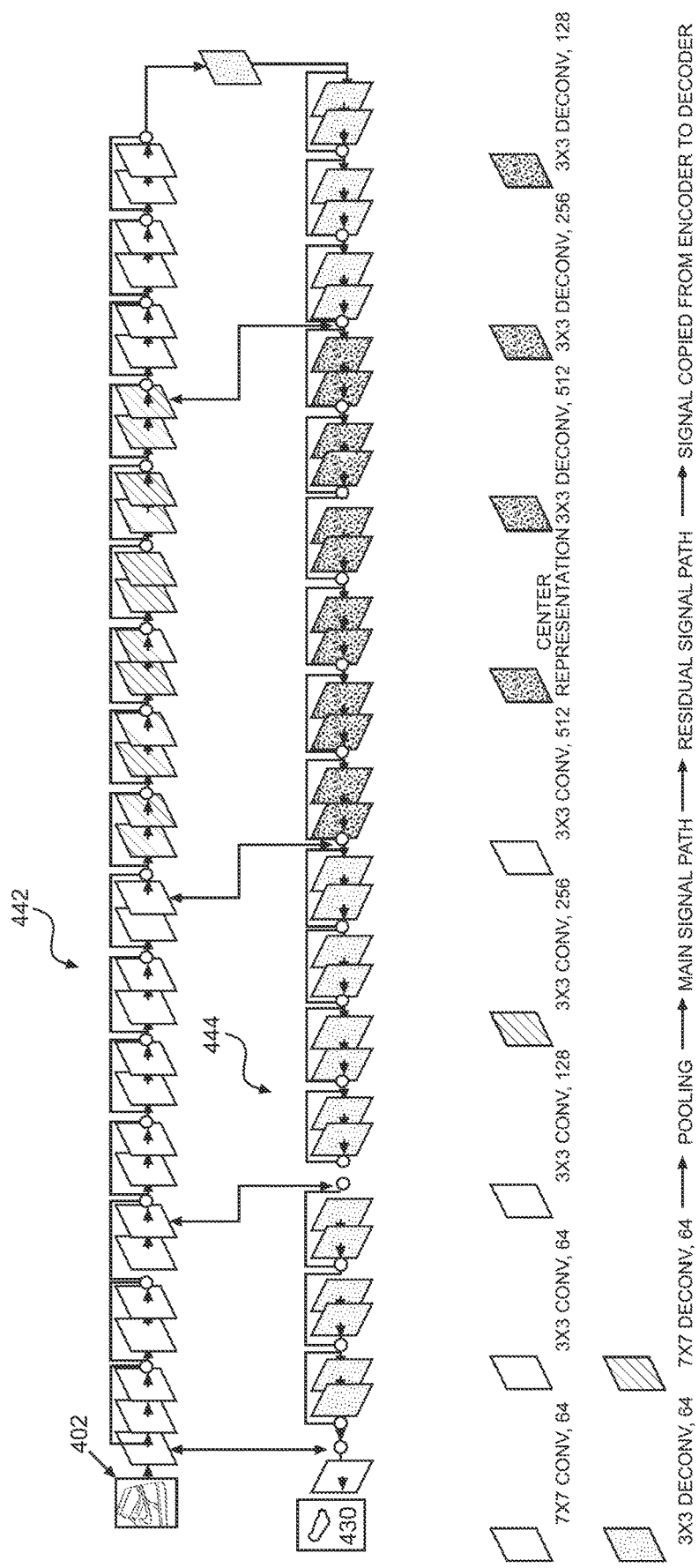
FIG. 4E is an exemplary diagram of one possible authentication engine phase in some embodiments.

As shown in FIG. 4E, a contraction path 442 of the encoder extracts features which contain information about what is portrayed in an input image 402 through the application of convolutional and input layers. After the pass through of the encoder layers, an expansion path 444 is applied in order to recover a feature map size that may have been reduced by the encoder. The output results in a binary mask 430 for a region of interest 416.

Figure 5:
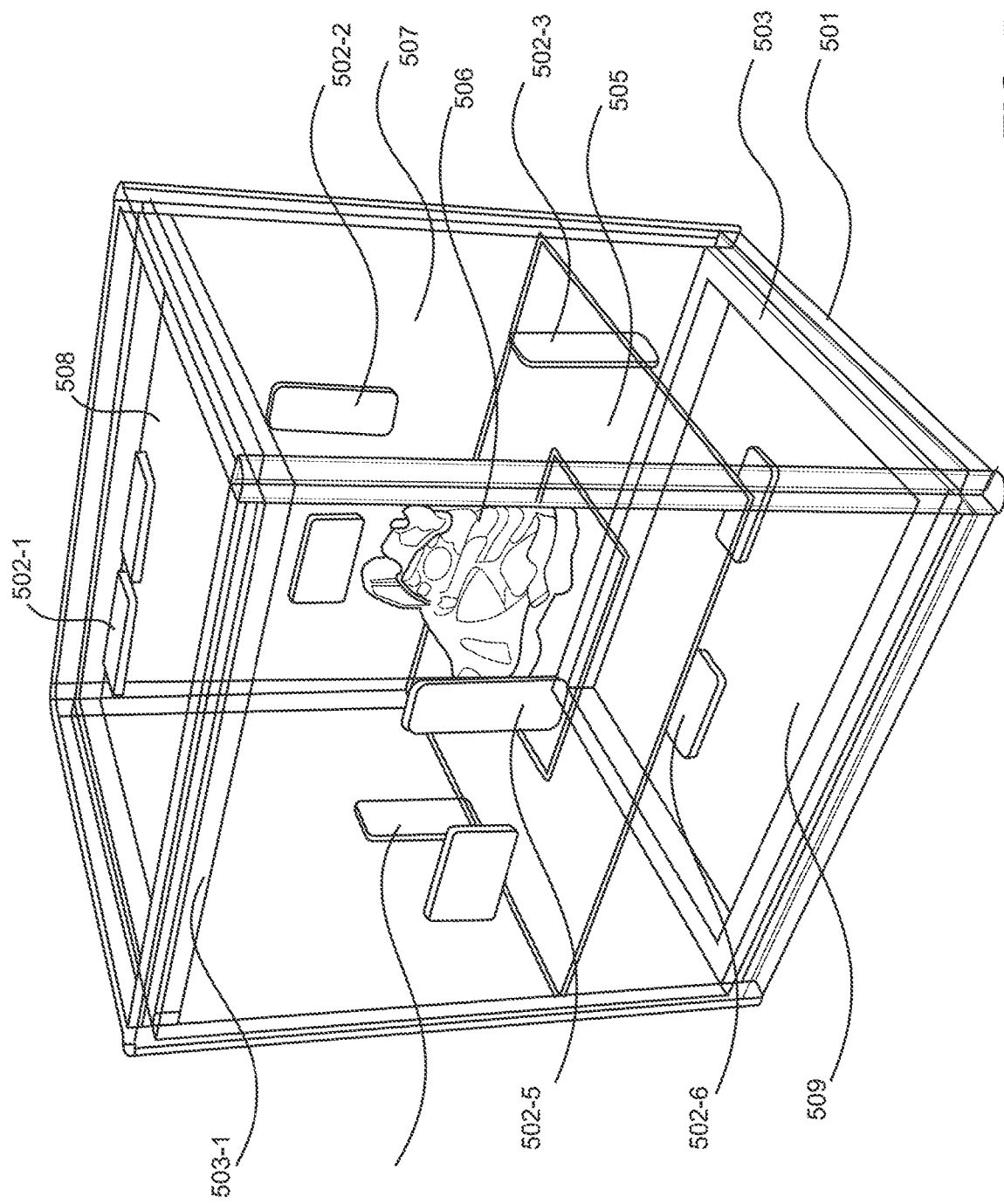
FIG. 5. is an exemplary diagram of a lightbox for the authentication engine in some embodiments.

As shown in FIG. 5, a suspect shoe 506 is situated in a fixed position on a platform 505 within a lightbox 501. There may be an opening 504 in the platform 505. The lightbox 501 may have multiple image capture devices (e.g. cameras, smartphones, etc.) 502-1, 502-2, 502-3, 502-4, 502-5, 502-6 at fixed or adjustable positions to capture images of various portions and various portions of the suspect shoe 506. Some of the image capture devices may be affixed to opaque walls 507 on the lightbox 501. Some of the image capture devices may be affixed to a top lid 508 the lightbox 501. The top lid 508 may be transparent or opaque. The lightbox 501 may have one or more lighting devices to provide proper lighting and shading of the suspect shoe 506 that results in input images at a specific resolution(s), contrast and brightness. The lighting devices may be attached to one or more frames 503-1, 503-2. The lightbox 501 may also include a mechanical switch that wirelessly, or via a wired connection, communications with the computer system when the top lid is closed 508, or when then switch is manually activated. The activation of the switch would initiate the capture of the images form the various image capture devices.

Various embodiments may be independent from utilization of a lightbox. For example, a mobile device (such as a smartphone) with depth imaging combined with SLAM (Simultaneous Localization and Mapping) may provide reliable distance measure. A mobile device may also provide image data indicative of reference distances with respect to a suspect item to allow for measurements in centimeters instead of pixels. Given the distance measure, the authentication system may compute the luminance levels of the sneaker and guide the user in real-time to capture consistent images of one or more regions of the sneaker at a required resolution. Various embodiments may also include techniques to discard noisy, garbage images in real-time, so that the mobile device isn't capturing and uploading unwanted images.

The system may present a user interface with reference images or other information to direct the user to take appropriate images. These images may be presented via the user interface before or during image capture. The user may be presented, via the user interface, with overlays, bounding boxes, or other templates during capture. If so, the user may be prompted to align the suspect item, such as within a graphical bounding box, or other shape or graphical indication. The system may use machine learning or other techniques to recognize the presence and position of a suspect item, either in real time or after image capture. The input to the machine learning system may include images, video, depth, or other sensor data. The system may use this information to allow or deny capture, or direct the user, via the user interface, to take an appropriate image with visual or other forms of feedback. Various embodiments may also include techniques to discard noisy, garbage images, so that the mobile device isn't capturing and uploading unwanted images. These techniques might be deployed in real-time, after image capture, or both. The system may direct users to review captured images manually before submission to ensure they are correct and high quality. For example, the device may process captured image and determine that an image is unsuitable for uploading to a server for further processing.

Embodiments may be used on a wide variety of computing devices in accordance with the definition of computer and computer system earlier in this patent. Mobile devices such as cellular phones, smart phones, PDAs, and tablets may implement the functionality described in this patent.

Figure 6:
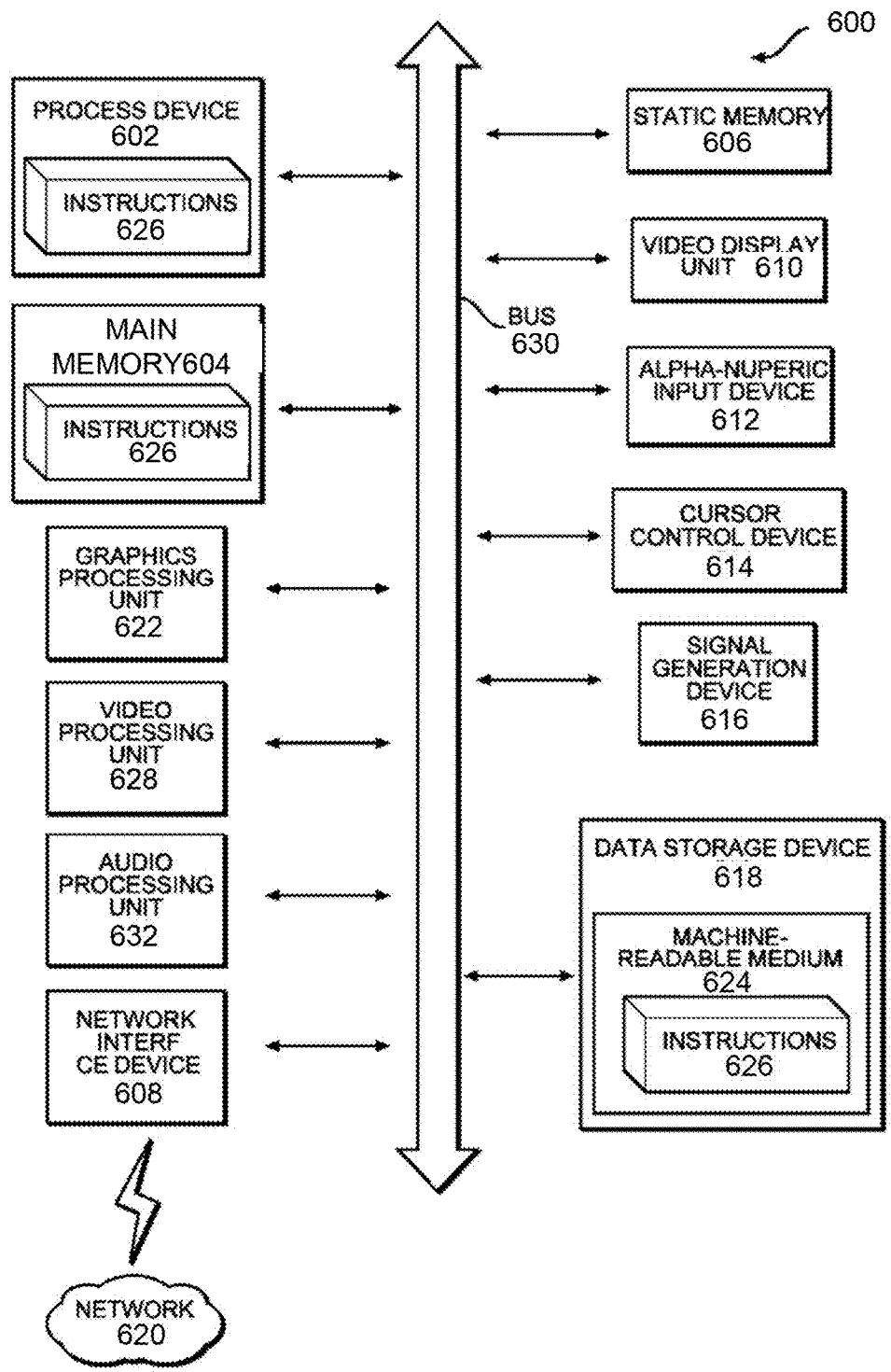
FIG. 6 is an exemplary diagram of one environment in which some embodiments may operate.

FIG. 6 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) or an input touch device, a graphics processing unit 622, a signal generation device 616 (e.g., a speaker), graphics processing unit 622, video processing unit 628, and audio processing unit 632.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In one implementation, the instructions 626 include instructions to implement functionality corresponding to the components of a device to perform the disclosure herein. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Figure 7:
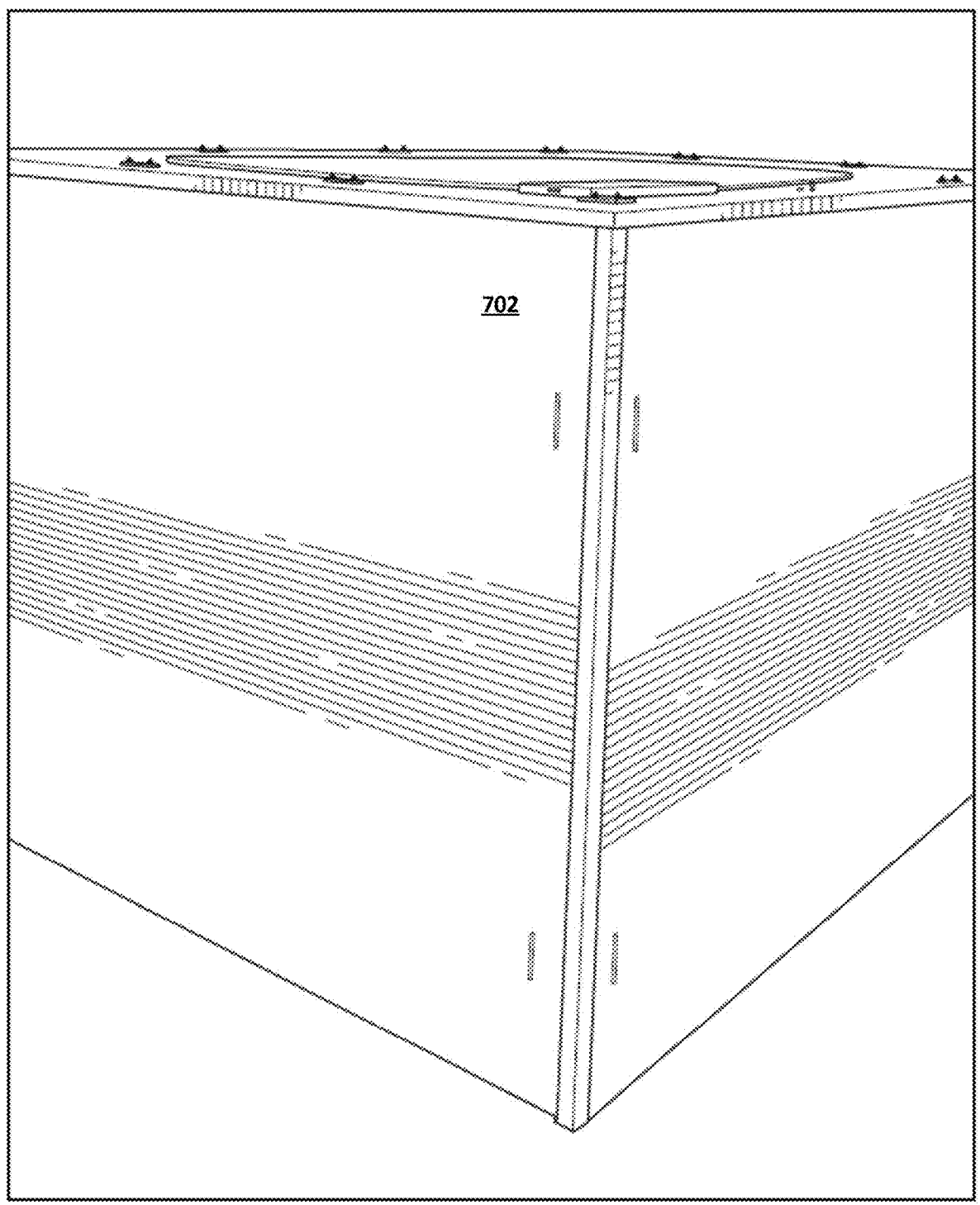
FIG. 7 is an exemplary diagram of one environment in which some embodiments may operate.

As shown in FIG. 7, an exterior view of a lightbox is provided. The lightbox may have a top lid 702 which may be movable to reveal an interior compartment to house a suspect item.

Figure 8:
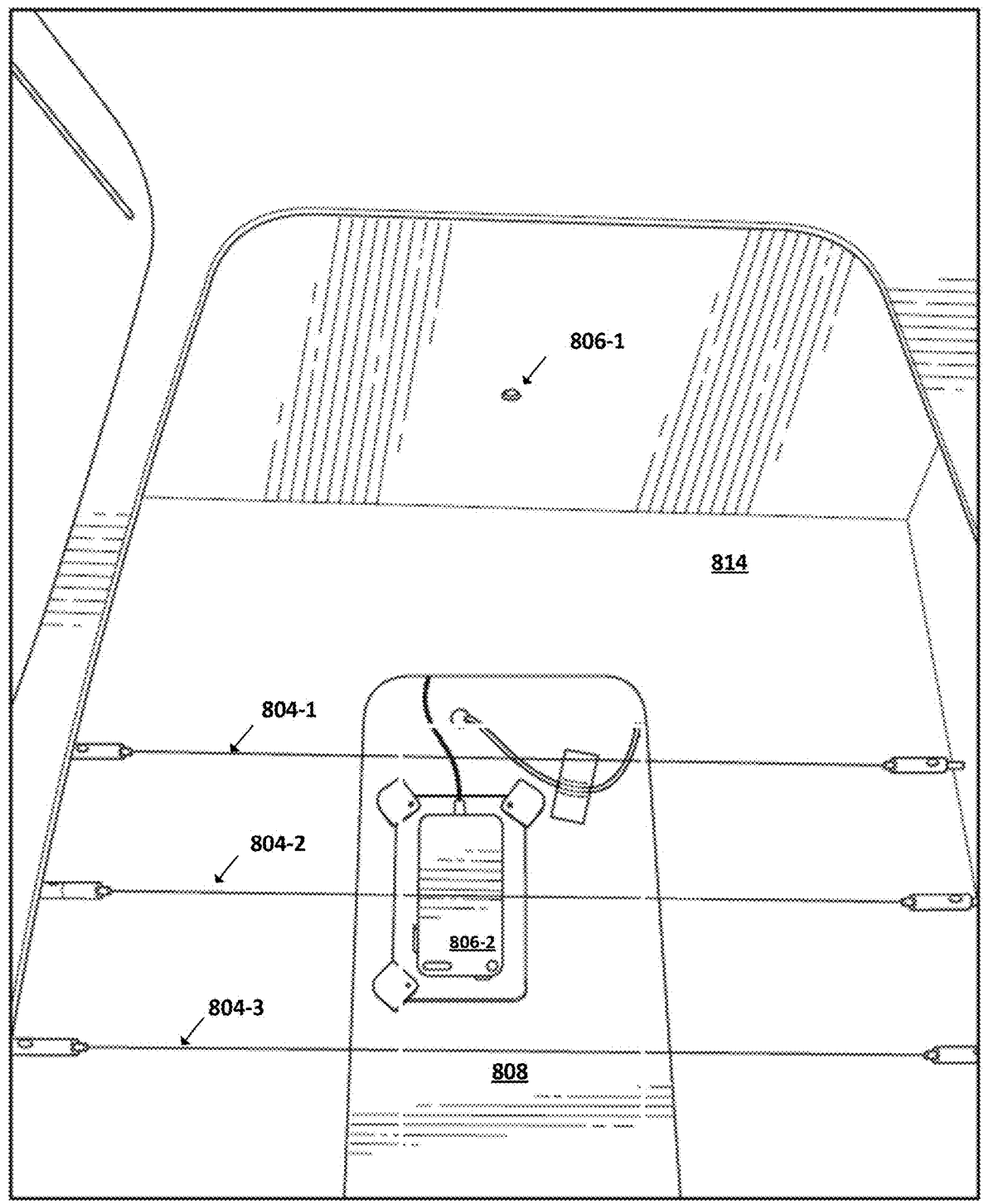
FIG. 8 is an exemplary diagram of one environment in which some embodiments may operate.

As shown in FIG. 8, an interior view of a lightbox is provided. For example, a view of an interior compartment is provided. The interior compartment may include one or more guidewires 804-1, 804-2, 804-3 upon which a suspect item can be placed. The interior compartment may include a shelf 814 positioned proximate to the guidewires 804-1, 804-2, 804-3. The interior compartment may include one or more positions for camera lenses 806-1, 806-2, such as a camera lens 806-2 of a smartphone 810. The shelf 814 may have an opening 808 that will provide a view of a portion of the suspect item for a camera lens 806-2 of a smartphone 810. For example, if the suspect item is a suspect shoe, the opening 808 provides the smartphone's 810 camera lens 806-2 with a view of the bottom of the sole of the suspect shoe. The interior compartment may include one or more lighting devices 812 to provide for lighting and shading when one or more input images of the suspect item are captured via the camera lenses 806-1, 806-2.

In one embodiment, the guide wires are used to support the suspect item such that a bottom view image may be obtained by a digital camera. In another embodiment, the opening in the shelf 814 may also have one or more clear plate or portions made of material such as glass or plastic. Ideally, the material is of a low refractive index and/or includes some other coating on the material such that it reduces reflective glare from the internal lighting.

When the system obtains digital imagery of the bottom of the suspect item, the image may include a depiction of the guidewires. Before processing the image to as part of the authenticity determination, the system may correct the image by identify those pixels in the image that include the guidewires and smoothing out the image for the pixels such that the pixels display a correct view of the image. For example, the system may take a group of pixels adjacent to the pixels depicting the guidewires. The system may then replace the pixels depicting the guidewires with a copy of the group of pixels.

An embodiment may use depth imaging to detect the suspect item, and use depth images, possibly in combination with other input, to distinguish the suspect item from the lightbox or other background.

The interior color of the lightbox is ideally a uniform color to be used for chroma keying. Additionally, the color may be any color suitable such that boundaries of the suspect item may be determined by image processing. The system may use chroma keying with backgrounds of any color that are uniform and distinct, certain green hues may be more suitable than other colors. The system may remove the background pixels in the uniform color to obtain imagery with pixels only of the suspect item.

Figure 9:
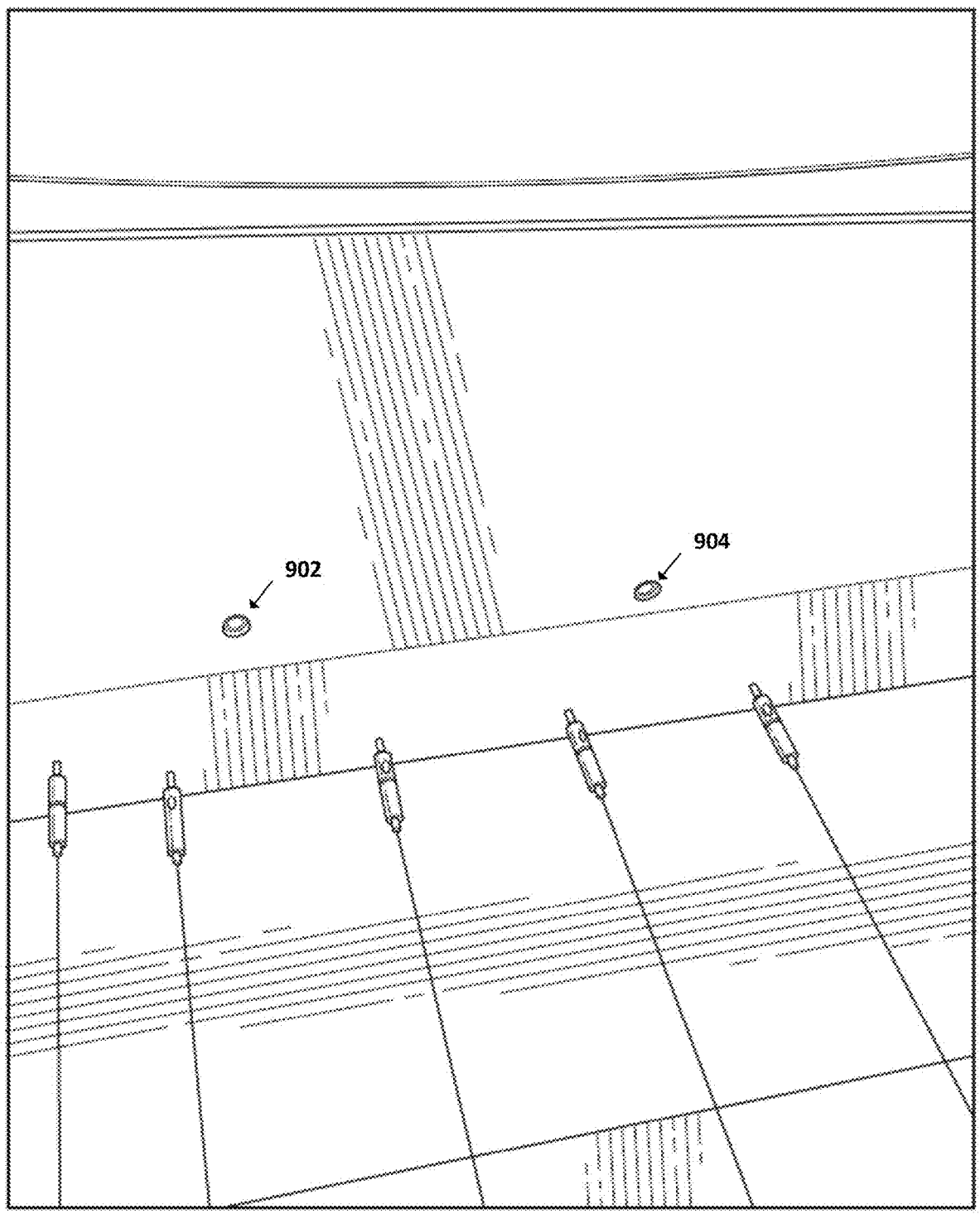
FIG. 9 is an exemplary diagram of one environment in which some embodiments may operate.

As shown in FIG. 9, an interior view of a lightbox is provided. The lightbox may include one or more apertures 902, 904 for camera lens positions. The light box includes four side panels, a bottom panel and a top panel. The bottom panel is affixed to a bottom portion of the four side panels. Each of the four side panels each include one or more apertures. The top panel is affixed to a top portion of the four side panels. The top panel has a moveable lid for access into the lightbox. The lightbox has a shelf portion affixed to at least two of the four side panels. The shelf portion may also be detached from the four side panels and supported by three or more affixed to the bottom side of the shelf portion. The shelf portion divides the lightbox into two enclosures, an upper enclosure and a lower enclosure. The shelf portion has an opening with guidewires positioned across the opening of the shelf portion. A lighting source is affixed in the upper enclosure and a lighting source is affixed in the lower enclosure. Additionally, the light box may include four outer panels with each panel removably affixed to an outer side of the four side panels. The outer panels may be used to hide wiring and/or the image capture devices.

Figure 10:
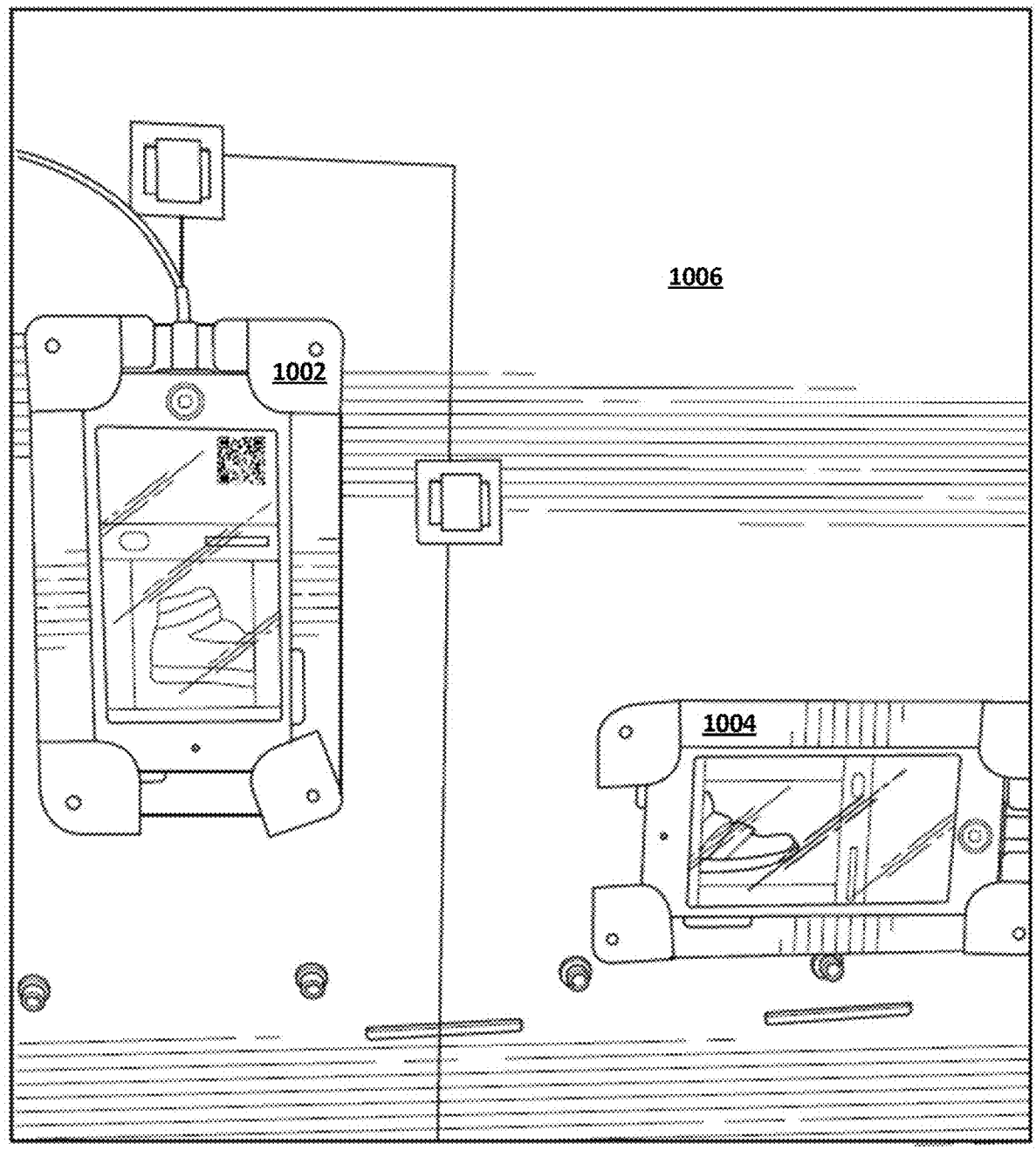
FIG. 10 is an exemplary diagram of one environment in which some embodiments may operate.

As shown in FIG. 10, an exterior view of a lightbox surface 1006 is provided. The lightbox surface 1006 may include one or more brackets 1002, 1004 which hold image capture devices (such as smartphones) in a fixed position such that the respective camera lenses of the smartphones are positioned with respect to apertures to so as to obtain digital imagery of views of the interior compartment of the lightbox. The one or more brackets 1002, 1004 may be adjustable to accommodate smartphones of varying sizes.

Figure 11:
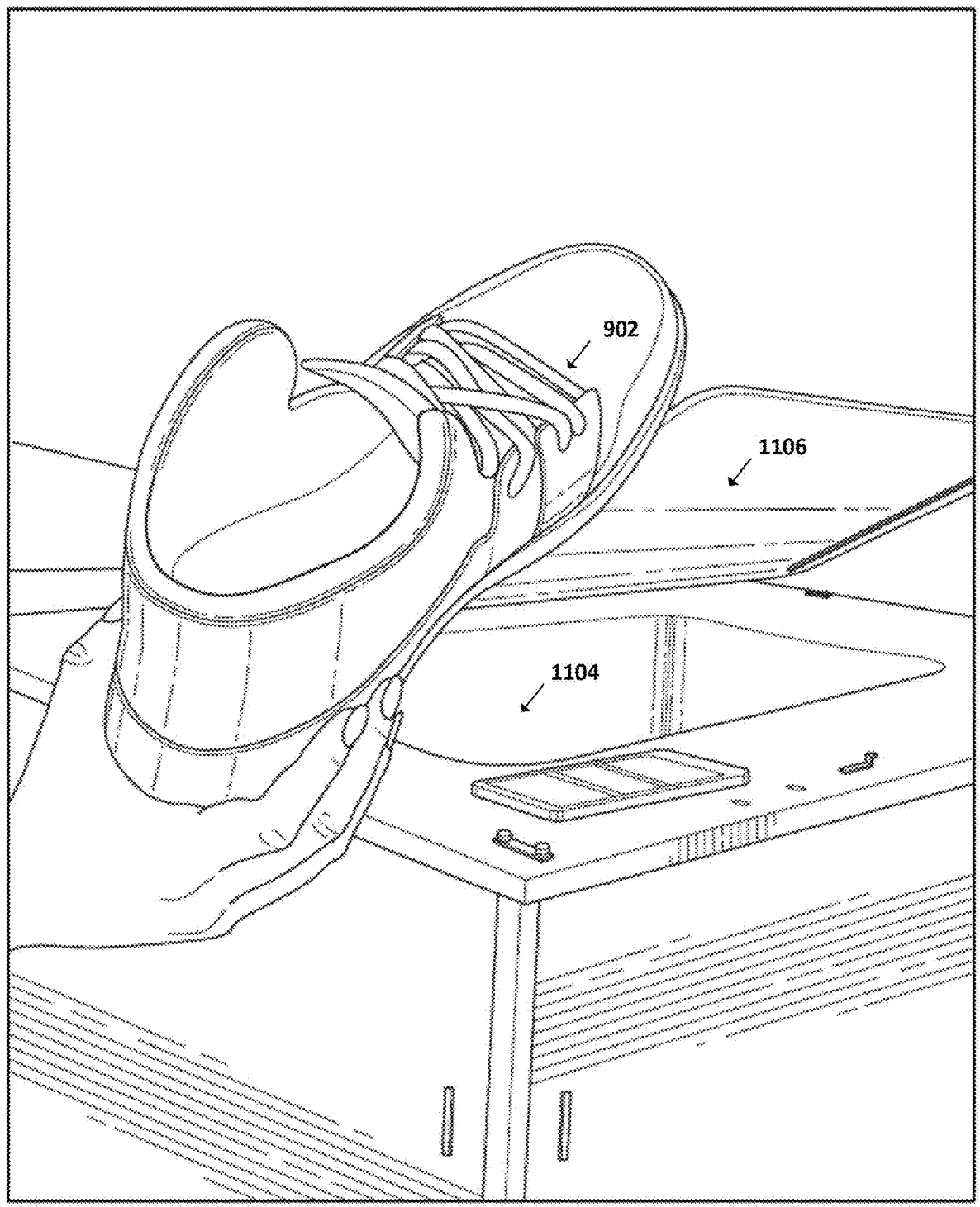
FIG. 11 is an exemplary diagram of one environment in which some embodiments may operate.

As shown in FIG. 11, a suspect shoe 1102 may place in an interior compartment of the lightbox through an upper opening 1104. The opening 1104 is accessible when a top lid 1106 of the lightbox is moved. For example, the lid 1106 may be hinged or removeable from the lightbox.

Figure 12:
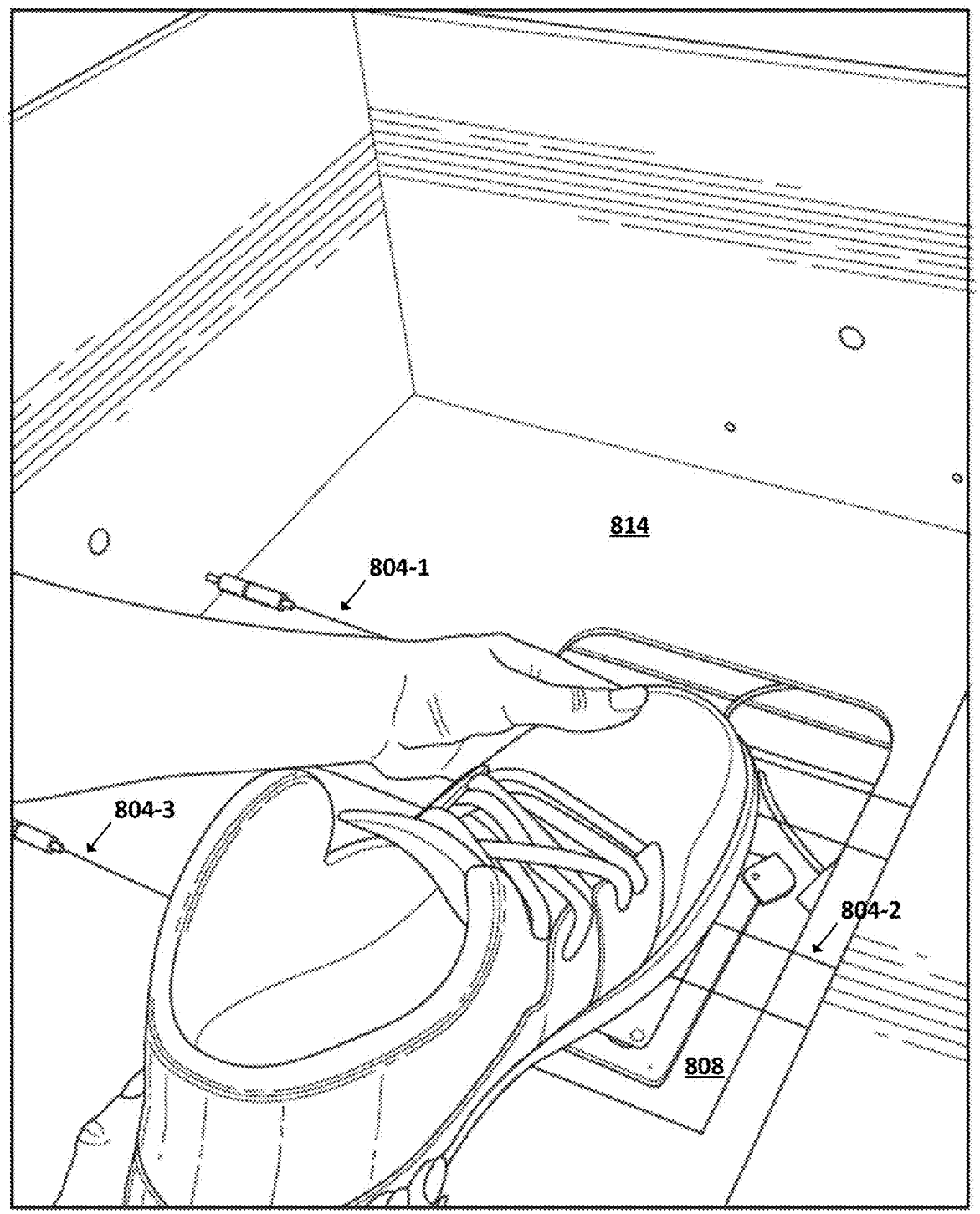
FIG. 12 is an exemplary diagram of one environment in which some embodiments may operate.

As shown in FIG. 12, a suspect shoe 1102 is placed in an interior compartment of the lightbox. The suspect shoe 1102 is placed on guidewires 804-1, 804-2, 804-3 such that the sole of the suspect shoe 1102 is proximate to an opening 808 of a shelf in the interior compartment. For example, the guidewires may be affixed to the side wall and/or to the shelf. The guidewires may be fixed to adjustment mechanism to tighten the guidewires. The adjustment mechanisms may be affixed to the side walls of the lightbox.

As shown in FIG. 13, a user interface 1302 for the authentication engine is displayed on a smartphone. The user interface 1304 may provide one or more icons that can provide a preview of captured input images of a suspect item placed inside a lightbox.

As shown in FIG. 14, a preview 1402 of captured input images of a suspect shoe may be displayed in a user interface 1302. The preview 1402 may provide a view of multiple captured input image icons, where each input image icon displays a different view of the suspect shoe.

As shown in FIG. 15, a preview 1502 of captured input mages of a suspect shoe may be displayed in a user interface 1302. The preview 1504 may provide selectable functionality for retaking one or more input images, accepting one or more input images and uploading one or more input images to a remote server or cloud computing environment.

Figure 16:
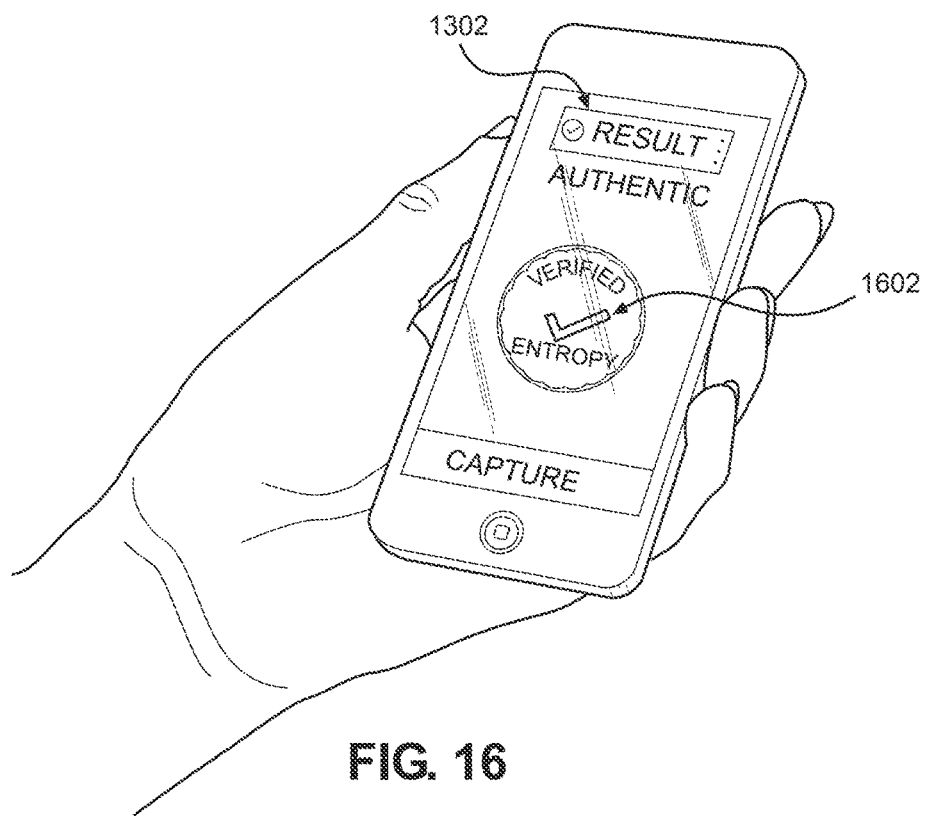
FIG. 16 is an exemplary diagram of one environment in which some embodiments may operate.
Figure 17:
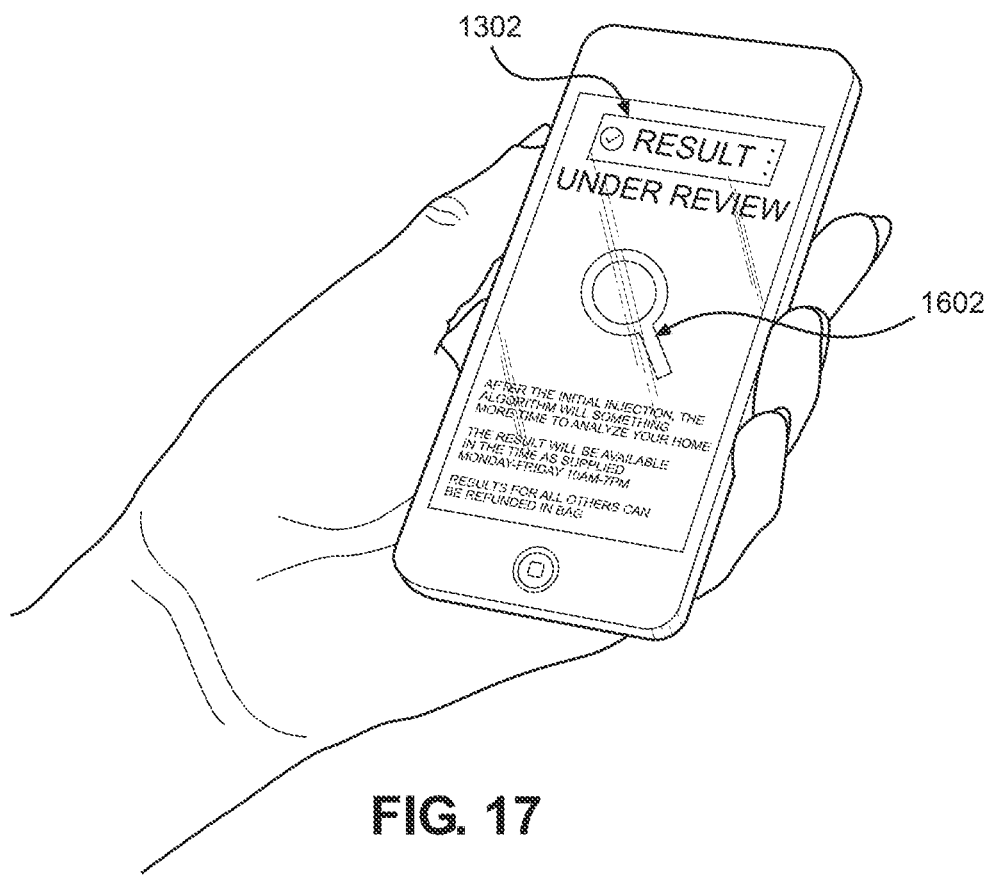
FIG. 17 is an exemplary diagram of one environment in which some embodiments may operate.

As shown in FIG. 16, an icon 1602 representing an authentic authenticity decision may be displayed in a user interface 1302. As shown in FIG. 17, an icon 1702 representing a counterfeit authenticity decision may be displayed in a user interface 1302.

Is understood that an embodiment may combine or weight the assessment of both a right and left suspect shoe in a pair of shoes in order to determine a composite score or value to determine authenticity. For example, a right shoe may be determined to be authentic (due to more accurate stitching, etc.) and a left shoe may be determined to be fake. The system may generate the composite score of the evaluation of both shoes. Individually, each shoe is assessed by the system as described herein. In one embodiment, the system may determine that that a composite score for both of the shoes may indicate that the shoes are likely to be fake.

Figure 18:
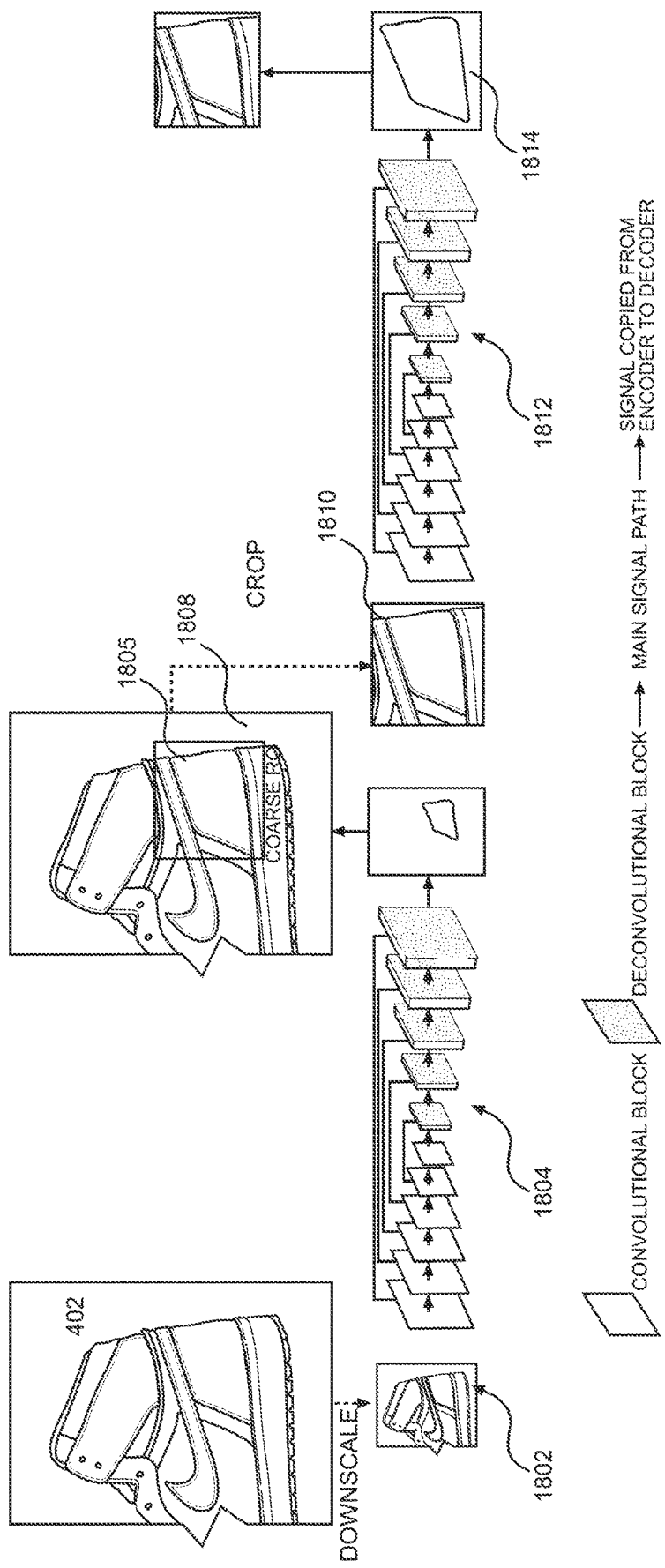
FIG. 18 is an exemplary diagram of one environment in which some embodiments may operate.
Figure 19:
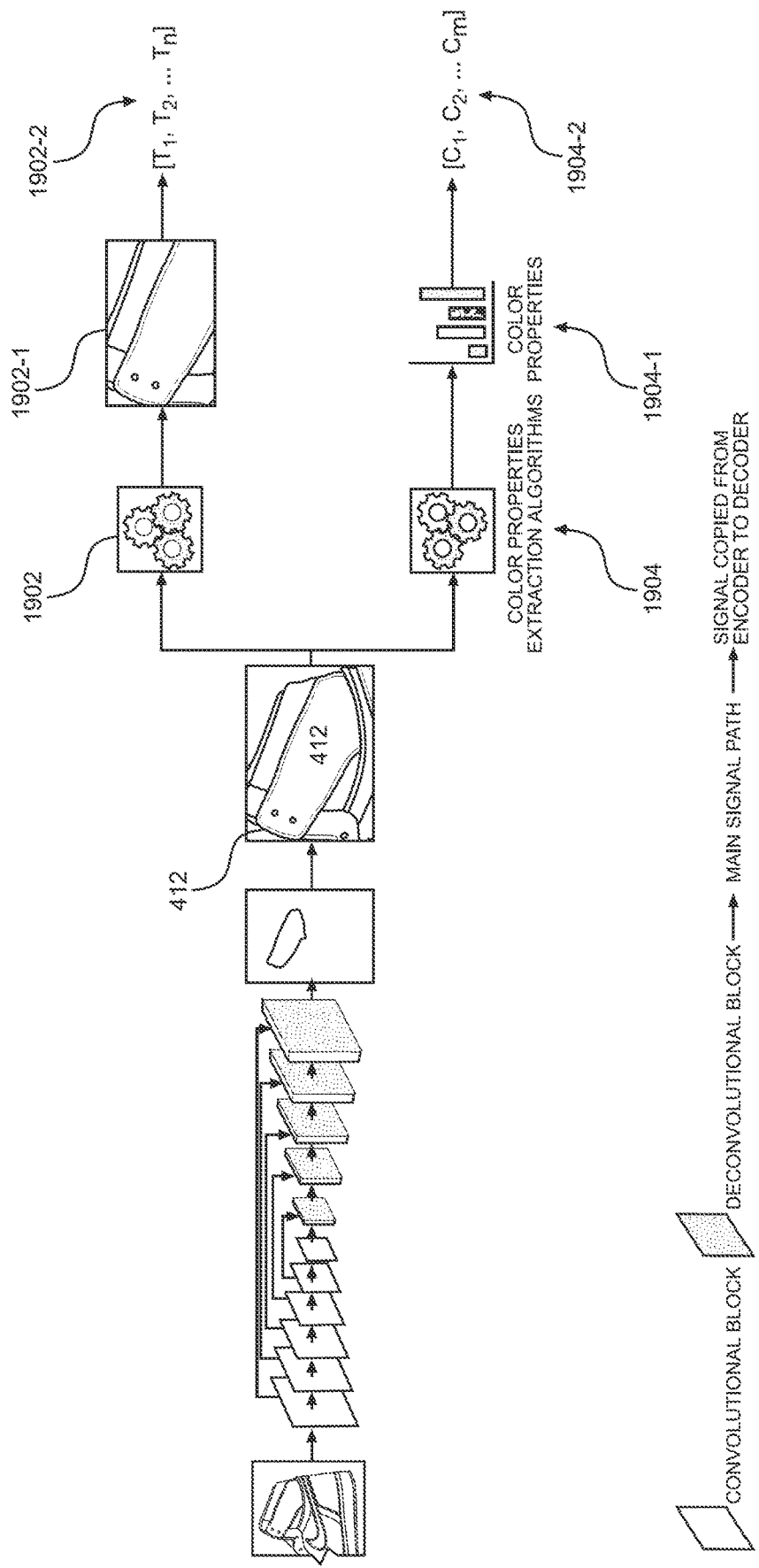
FIG. 19 is an exemplary diagram of one environment in which some embodiments may operate.

As shown in FIG. 18, various phases for image segmentation may be implemented by an embodiment to increase precision on feature measurements. For example, such an implementation may be based on two segmentation steps, as depicted in FIG. 18. Given an input image 402, the system may perform downscaling of the image 402 by a downscale factor, which can vary, as an example, from 2 to 10 times a reduction in size, thereby generating a smaller sized image having less pixels than the original input image 402. In one embodiment, the aspect ratio of the original image is maintained as to the smaller, downscaled imaged 1802. The system then processes the downscaled image 1802 by sending the downscaled image 1802 into an encoder-decoder deep neural architecture 1804 to obtain a first coarse-grained segmentation 1806 of a coarse region of interest ("Coarse RoI") 1805. This coarse segmentation 1806 is used to construct a square bounding box 1808 around Coarse RoI 1805 to delineate the position inside the input image 402 where the Coarse RoI 1805 is placed. The bounding box 1808 is further mapped back in according to the original size of the input image 402. The bounding box region 1808 may be cropped as a squared region 1810 from the original image 402 (in full resolution). The cropped region 1810 in full resolution may be fed into a second encoder-decoder deep neural network architecture 1812, which may generate a smooth segmentation 1814 of the Coarse RoI 1805 from where one or more measurements will be extracted. As shown in FIG. 19, texture and color features may also be extracted in addition to distances and angle measurements. To extract such texture and color features, an embodiment of the system may segment an RoI 412. Next, after segmentation, one or more texture and color algorithms 1902, 1904 may be executed by the system to capture texture and color properties 1902-1, 1904-1 in the RoI 412. For example, the texture features may identify a type of texture for the RoI, such as canvas, leather, smooth, glossy, grained, etc. The texture properties algorithm 1904 may generate a value or indication of the type of the texture (e.g., $T_1, T_2, \ldots T_n$). For example, the color features may identify different colors, luminosity, color, hue, tone, saturation, blur and/or brightness of the RoI 412. The color algorithm 1902 may generate values for the different color features (e.g., $C_1, C_2, \ldots C_m$). For texture properties 1902-1, for example, the algorithms 1902 may be Histogram of Oriented Gradients (HOG) and Local Binary Patterns (LBP). For color properties 1904, for example, the algorithms 1904-1 may be Color Histograms and Color Layout Descriptor (CLD). Any one or a combination of the aforementioned algorithms 1902, 1904 may be used to generate a feature vector 1902-2, 1904-2 which can be used as an input to a classifier(s) or the threshold based distance similarity measure.

Figure 20:
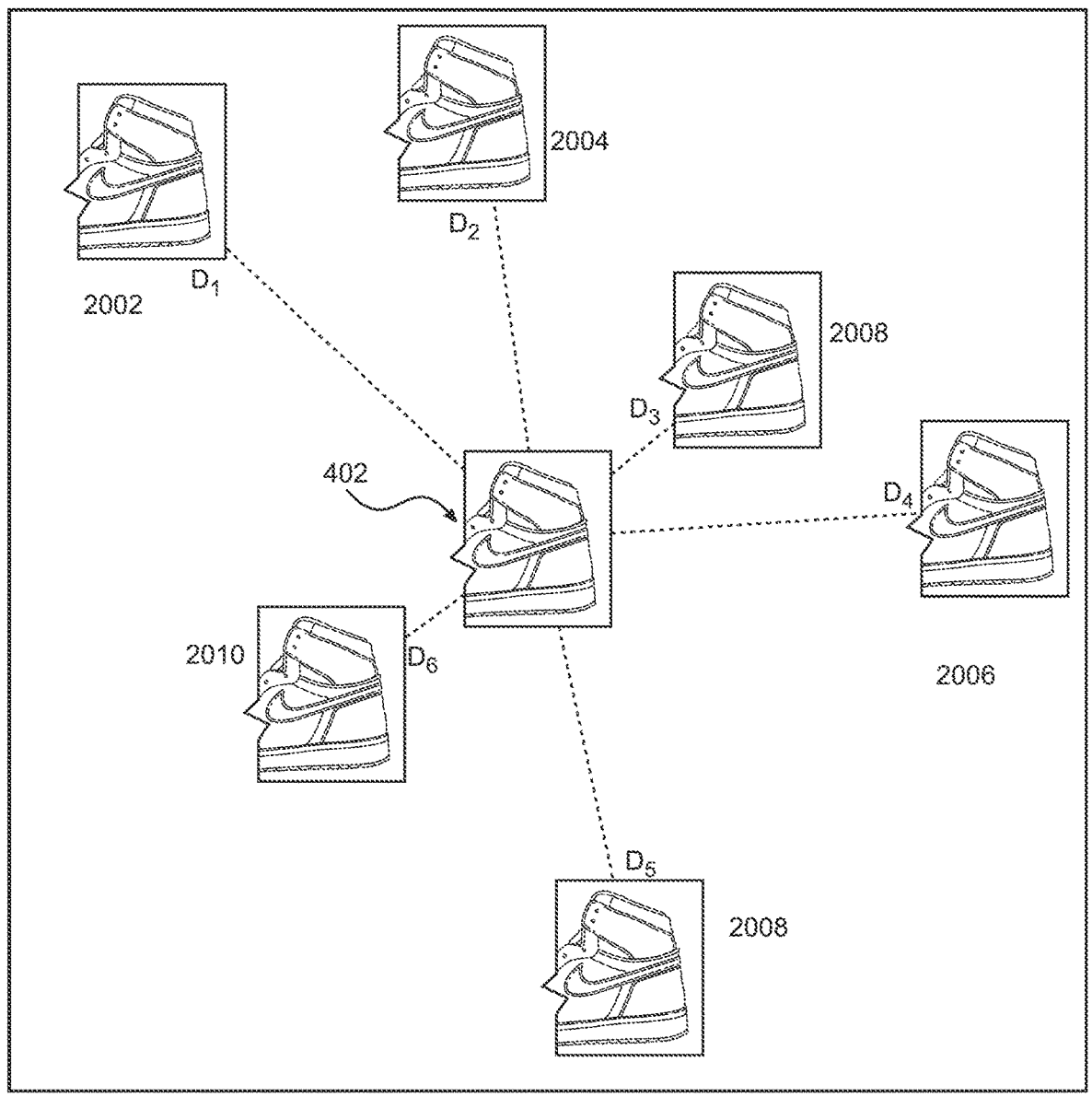
FIG. 20 is an exemplary diagram of one environment in which some embodiments may operate.

As shown in FIG. 20, an embodiment of the system may determine if a suspect item is counterfeit with respect to threshold features (distances, texture, color, etc.) extracted from a representative set of images of authentic items and counterfeit items of the same type of item as the suspect item. That is, for example, if the suspect item is of a type of sneaker model from a particular brand, then the representative set of images will portray image data and features of authentic and counterfeit instances of that type of sneaker model. It is understood that the representative set of images can also be used as training data for a machine learning-based embodiment. To determine if one or more input images of a suspect item portrays a counterfeit item, features of the suspect item are compared against threshold features from the representative set of authentic/counterfeit item images and selection, for the suspect item, of the class ("authentic" or "fake") that has the most similar threshold features (or making a vote against the K most-similar representative images). Such comparison is performed by measuring the distance D from an input image 402 of the suspect item against all of the known images 2002, 2004, 2006, 2008, 2010, 2012 in the representative set in terms of their threshold features (heights, texture, color, etc.). As illustrated in FIG. 20, the input image 402 is represented in a center positions, while images 2002, 2004, 2006, 2008 (with distances D1, D2, D4, D5) portray authentic instances and images 2008, 2010 (with distances D3, D6) portray counterfeit instances.

For the three closest images 2010, 2008, 2006 (K=3) illustrated at distances D6, D3, D4, respectively, a counterfeit tag will be chosen for the input image 402 since there are two counterfeits and one authentic among the three images 2010, 2008, 2006. Once the suspect item in the input image 402 is described by a feature vector composed of numerical values representing features measurements, the values for the respective distances D6, D3, D4 from the images 2010, 2008, 2006 can be measured using some proper distance metric (as Euclidean, Cosine, etc.).

As shown in FIG. 21, a distance matrix 2102 may be constructed based on a set of authentic images and the behavior of an input image(s) of the suspect item when compared against those authentic images. The input image's behavior may be represented at the two last lines in matrix. For each line in the distance matrix 2102, each column in the distance matrix 2102 depicts the distance of a representative authentic image (given by Y-axis label) to all of the others authentic images in the dataset (just two closest distances are kept in table, been the other distances replaced by 0.0 in table). Small distances (different from zero) represent most similar samples.

Figure 22:
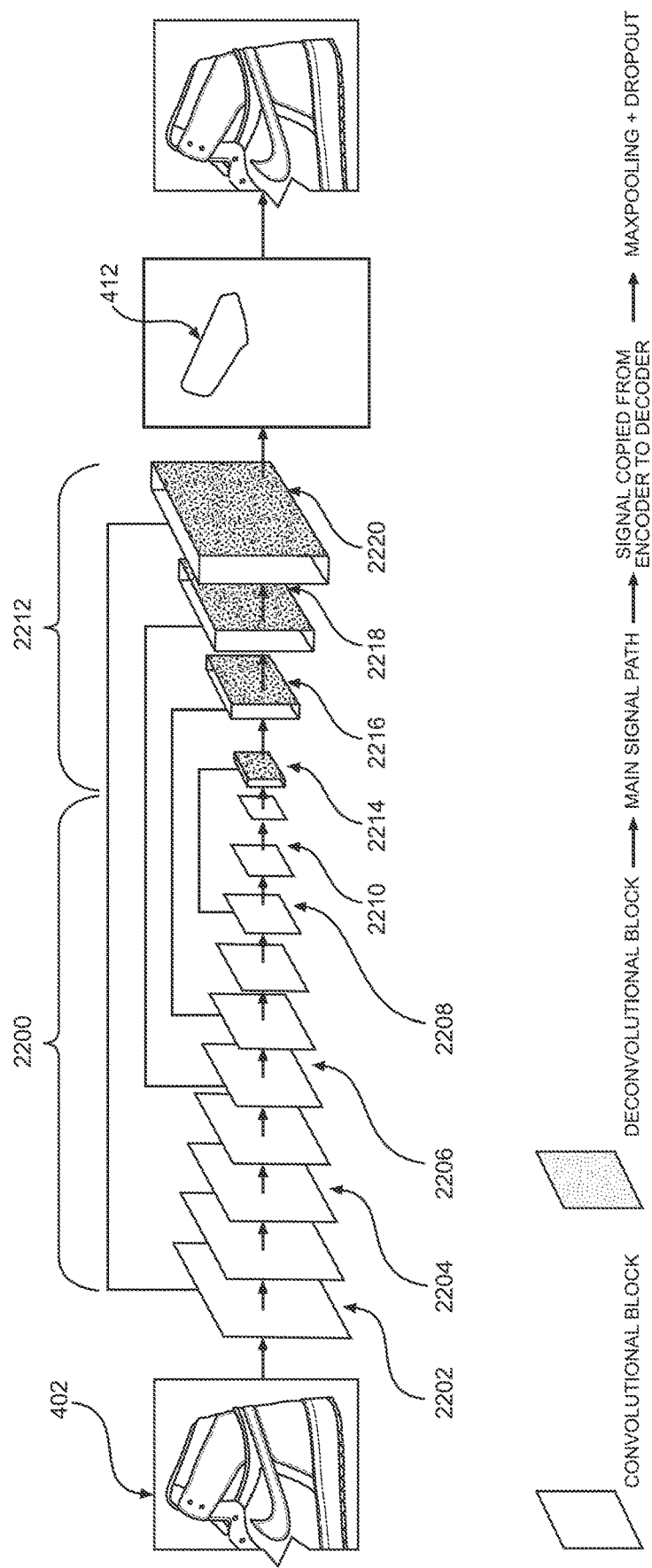
FIG. 22 is an exemplary diagram of one environment in which some embodiments may operate.

As shown in FIG. 22, an encoding path 2200 may be a system architecture process that receives a 128×128 input image 402 and may have a first convolutional block 2202 with two convolutional layers—each layer having 16 filters each—a kernel size=3 and a batch normalization. A maxpooling layer may follow and a 0.025 dropout may be applied. A second convolutional block 2204 may have two convolutional layer—each layer having 32 filters—and the kernel size=3 and a batch normalization. Again, a maxpooling layer follows and then a 0.05 dropout is applied. A third convolutional block 2206 may have two convolutional layers —with 64 layers per filter, the kernel size=3 and a batch normalization. A maxpooling layer and 0.05 dropout application follows the third convolutional block 2206. A fourth convolutional block 2208 may have two convolutional layers—with 128 filters per layer—and also the kernel size=3 and a batch normalization. A maxpooling layer and a 0.05 dropout is then applied. A fifth convolutional block 2210 may have two convolutional layers with 256 filters per layer, the kernel size=3 and a batch normalization. A maxpooling layer is then followed by a 0.05 dropout.

A decoding path 2212 may have an architecture that has a first deconvolutional block 2214 with a deconvolutional layer (a transpose convolution) with 128 filters with 3×3 kernels, with a 2 pixels stride. This result is concatenated with a direct path signal (obtained from the encoder 2200) and processed through a convolutional block 2208 with 128 filters and the kernel size of 3. A second deconvolutional block 2216 may have deconvolutional layer (a transpose convolution) with 64 filters with 3×3 kernels and a 2 pixels stride. This result is concatenated with a direct path signal (obtained from the encoder 2200) and processed through a convolutional block 2206 with 64 filters with kernel size of 3. A third deconvolutional block 2218 may have a deconvolutional layer (a transpose convolution) with 32 filters with 3×3 kernels and a 2 pixels stride. This result is concatenated with a direct path signal (obtained from the encoder 2200) and processed through a convolutional block 2204 with 32 filters with kernel size of 3. Finally, a last deconvolutional block 2220 uses a deconvolutional layer (a transpose convolution) with 16 filters and 3×3 kernels with a 2 pixels stride. This result is concatenated with a direct path signal (obtained from the encoder 2200) and processed through a convolutional block 2206 with 64 filters with kernel size of 3. A result signal is then processed by a sigmoid layer, generated for each pixel, with a probability of whether or not the respective pixel belongs to RoI 412. In one embodiment, the architecture may be trained using an Adam optimizer and a binary_crossentropy loss function, by 2000 epochs using a batch size of 32.

Embodiments may further include a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

Embodiments may include a machine-readable storage medium (also known as a computer-readable medium) on which is stored one or more sets of instructions or software embodying any one or more of the methodologies or functions described herein. The term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method for identifying a counterfeit item:
   capturing at least one input image of a suspect item;
   identifying, in the at least one input image, one or more regions of interest of the suspect item;
   determining measurements for the one or more regions of interest;
   comparing the measurements to threshold measurements of an item model that corresponds to an authentic version of the suspect item; and
   determining whether the suspect item is authentic or counterfeit based on a result of the comparison;
   wherein determining the measurements of the one or more regions of interest comprises:
      for each different region of interest (RoI) extracted from the respective input image according to an encoder-decoder analysis:
         (i) measuring distances between various points on an RoI boundary;
         (ii) constructing an RoI feature vector, wherein a value of each specific measured distance corresponds to a feature type of the RoI feature vector; and
         (iii) performing an early fusion of features to construct a classification feature vector based on the different RoI feature vectors.

2. The computer-implemented method of claim 1, wherein identifying, in the at least one input image, one or more regions of interest of the suspect item comprises:
   segmenting different regions of interest on a suspect shoe portrayed in a respective input image according to the encoder-decoder analysis based on deep neural networks.

3. The computer-implemented method of claim 1, wherein an RoI feature vector for each different region of interest comprises a plurality of feature types, one feature type comprising a stitched seam width that is RoI specific.

4. The computer-implemented method of claim 1, wherein comparing the measurements to threshold measurements of an item model that corresponds to an authentic version of the suspect item comprises:
   inputting the classification feature vector into a classifier defined according to a machine learning supervised learning model, the classifier based on attributes of the authentic version of the suspect item.

5. The computer-implemented method of claim 1, wherein determining whether the suspect item is authentic or counterfeit based on a result of the comparison comprises:
   receiving an authenticity decision from the machine learning supervised learning model based on the input classification vector.

6. The computer-implemented method of claim 1, wherein capturing at least one input image of a suspect item comprises:
   triggering, from a mobile device, capture of a plurality of input images of a suspect shoe situated according to a fixed position inside a physical lightbox, wherein each captured input image portrays (i) a view of a different portion of the shoe and (ii) a plurality of regions of interest possibly corresponding to pre-defined regions of interest of the item model.

7. A system comprising one or more processors, and a non-transitory computer readable medium storing a plurality of instructions, which when executed, cause the one or more processors to perform the operations of:
   capturing at least one input image of a suspect item;
   identifying, in the at least one input image, one or more regions of interest of the suspect item;
   determining measurements for the one or more regions of interest;
   comparing the measurements to threshold measurements of an item model that corresponds to an authentic version of the suspect item; and
   determining whether the suspect item is authentic or counterfeit based on a result of the comparison;
   wherein determining the measurements of the one or more regions of interest comprises:
      for each different region of interest (RoI) extracted from the respective input image according to an encoder-decoder analysis:
         (i) measuring distances between various points on an RoI boundary;
         (ii) constructing an RoI feature vector, wherein a value of each specific measured distance corresponds to a feature type of the RoI feature vector; and
         (iii) performing an early fusion of features to construct a classification feature vector based on the different RoI feature vectors.

8. The system of claim 7, wherein identifying, in the at least one input image, one or more regions of interest of the suspect item comprises:
   segmenting different regions of interest on a suspect shoe portrayed in a respective input image according to the encoder-decoder analysis based on deep neural networks.

9. The system of claim 7, wherein an RoI feature vector for each different region of interest comprises a plurality of feature types, one feature type comprising a stitched seam width that is RoI specific.

10. The system of claim 7, wherein comparing the measurements to threshold measurements of an item model that corresponds to an authentic version of the suspect item comprises:
inputting the classification feature vector into a classifier defined according to a machine learning supervised learning model, the classifier based on attributes of the authentic version of the suspect item.

11. The system of claim 7, wherein determining whether the suspect item is authentic or counterfeit based on a result of the comparison comprises:
receiving an authenticity decision from the machine learning supervised learning model based on the input classification vector.

12. The system of claim 7, wherein capturing at least one input image of a suspect item comprises:
triggering, from a mobile device, capture of a plurality of input images of a suspect shoe situated according to a fixed position inside a physical lightbox, wherein each captured input image portrays (i) a view of a different portion of the shoe and (ii) a plurality of regions of interest possibly corresponding to pre-defined regions of interest of the item model.

13. A computer program product comprising a non-transitory computer-readable medium having a computer-readable program code embodied therein to be executed by one or more processors, the program code including instructions to perform the operations of:
capturing at least one input image of a suspect item;
identifying, in the at least one input image, one or more regions of interest of the suspect item;
determining measurements for the one or more regions of interest;
comparing the measurements to threshold measurements of an item model that corresponds to an authentic version of the suspect item; and
determining whether the suspect item is authentic or counterfeit based on a result of the comparison;
wherein determining the measurements of the one or more regions of interest comprises:
for each different region of interest (RoI) extracted from the respective input image according to an encoder-decoder analysis:
(i) measuring distances between various points on an RoI boundary;
(ii) constructing an RoI feature vector, wherein a value of each specific measured distance corresponds to a feature type of the RoI feature vector; and
(iii) performing an early fusion of features to construct a classification feature vector based on the different RoI feature vectors.

14. The computer program product of claim 13, wherein identifying, in the at least one input image, one or more regions of interest of the suspect item comprises:
segmenting different regions of interest on a suspect shoe portrayed in a respective input image according to the encoder-decoder analysis based on deep neural networks.

15. The computer program product of claim 13, wherein an RoI feature vector for each different region of interest comprises a plurality of feature types, one feature type comprising a stitched seam width that is RoI specific.

16. The computer program product of claim 13, wherein comparing the measurements to threshold measurements of an item model that corresponds to an authentic version of the suspect item comprises:
inputting the classification feature vector into a classifier defined according to a machine learning supervised learning model, the classifier based on attributes of the authentic version of the suspect item.

17. The computer program product of claim 13, wherein determining whether the suspect item is authentic or counterfeit based on a result of the comparison comprises:
receiving an authenticity decision from the machine learning supervised learning model based on the input classification vector.

18. The computer program product of claim 13, wherein capturing at least one input image of a suspect item comprises:
triggering, from a mobile device, capture of a plurality of input images of a suspect shoe situated according to a fixed position inside a physical lightbox, wherein each captured input image portrays (i) a view of a different portion of the shoe and (ii) a plurality of regions of interest possibly corresponding to pre-defined regions of interest of the item model.

* * * * *